US012021991B2

(12) United States Patent
Konda et al.

(10) Patent No.: US 12,021,991 B2
(45) **Date of Patent: *Jun. 25, 2024**

(54) METHODS AND SYSTEMS FOR IMPLEMENTING ZERO- KNOWLEDGE PROOFS IN TRANSFERRING PARTITIONED TOKENS ON DISTRIBUTED LEDGER-BASED NETWORKS

(71) Applicant: EYGS LLP, London (GB)

(72) Inventors: Chaitanya Reddy Konda, London (GB); Duncan James Westland, Addlestone (GB); Paul Richard Brody, Woodside, CA (US)

(73) Assignee: EYGS LLP, London (GB)

( * ) Notice: Subject to any disclaimer, the term of this patent is extended or adjusted under 35 U.S.C. 154(b) by 1021 days.

This patent is subject to a terminal disclaimer.

(21) Appl. No.: 16/542,701

(22) Filed: Aug. 16, 2019

(65) Prior Publication Data

US 2020/0059364 A1 Feb. 20, 2020

Related U.S. Application Data

(60) Provisional application No. 62/748,002, filed on Oct. 19, 2018, provisional application No. 62/719,636, filed on Aug. 18, 2018.

(51) Int. Cl.

*H04L 9/32* (2006.01)
*H04L 9/06* (2006.01)

(Continued)

(52) U.S. Cl.

CPC .......... *H04L 9/3218* (2013.01); *H04L 9/0643* (2013.01); *H04L 9/30* (2013.01);

(Continued)

(58) Field of Classification Search

CPC ... H04L 9/3218; H04L 9/0643; H04L 9/3213; H04L 9/3234; H04L 9/3242; H04L 9/3221; H04L 9/30; H04L 9/50

See application file for complete search history.

(56) References Cited

U.S. PATENT DOCUMENTS

| | | |
|---|---|---|
| 9,397,985 B1 | 7/2016 | Seger et al. |
| 9,608,829 B2 | 3/2017 | Spanos et al. |

(Continued)

FOREIGN PATENT DOCUMENTS

| | | |
|---|---|---|
| CN | 107274184 A | 10/2017 |
| CN | 106598824 B | 11/2018 |

(Continued)

OTHER PUBLICATIONS

Andreev, O., “Hidden in Plain Sight: Transacting Privately on a Blockchain. Introducing Confidential Assets in the Chain Protocol,” [Online], Retrieved from the Internet: <URL: https://blog.chain.com/hidden-in-plain-sight-transacting-privately-on-a-blockchain-835ab7 . . . ], Retrieved on Aug. 27, 2018, 11 pages.

(Continued)

*Primary Examiner* — Noura Zoubair

(74) *Attorney, Agent, or Firm* — COOLEY LLP

(57) ABSTRACT

One or more embodiments described herein disclose methods and systems that are directed at providing enhanced privacy, efficiency, convenience and security to distributed ledger-based networks (DLNs) via the implementation of zero-knowledge proofs (ZKPs) in the DLNs. ZKPs allow participants of DLNs to make statements on the DLNs about some private information and to prove the truth of the information without having to necessarily reveal the private information publicly. As such, the disclosed methods and systems directed at the ZKP-enabled DLNs provide privacy, (Continued)

ease and efficiency to participants of the DLNs while still allowing the DLNs to remain as consensus-based networks.

20 Claims, 3 Drawing Sheets

(51) Int. Cl.
*H04L 9/30* (2006.01)
*H04L 9/00* (2022.01)

(52) U.S. Cl.
CPC .......... *H04L 9/3213* (2013.01); *H04L 9/3234* (2013.01); *H04L 9/3242* (2013.01); *H04L 9/3221* (2013.01); *H04L 9/50* (2022.05)

(56) References Cited

U.S. PATENT DOCUMENTS 9,785,369 B1 10/2017 Ateniese et al.
9,794,074 B2 10/2017 Toll et al.
9,870,508 B1 1/2018 Hodgson et al.
9,881,176 B2 1/2018 Goldfarb et al.
9,906,513 B2 2/2018 Wuehler
9,942,231 B1 4/2018 Laucius et al.
9,948,467 B2 4/2018 King
9,959,065 B2 5/2018 Ateniese et al.
10,026,118 B2 7/2018 Castinado et al.
10,825,295 B2 11/2020 Simons
10,833,861 B2 11/2020 Chari et al.
10,951,409 B2 3/2021 Konda et al.
11,146,399 B2 10/2021 Westland et al.
11,188,977 B2 11/2021 Youb et al.
2016/0260169 A1* 9/2016 Arnold ................ G06Q 20/023
2016/0358165 A1 12/2016 Maxwell
2017/0091750 A1 3/2017 Maim
2017/0161829 A1 6/2017 Mazier
2017/0163733 A1 6/2017 Grefen et al.
2017/0278100 A1 9/2017 Kraemer et al.
2017/0293503 A1 10/2017 Curtis
2017/0346639 A1 11/2017 Muftic
2018/0048461 A1 2/2018 Jutla et al.
2018/0077122 A1 3/2018 Hoss et al.
2018/0101701 A1 4/2018 Barinov et al.
2018/0137465 A1 5/2018 Batra et al.
2018/0139043 A1 5/2018 Jayachandran et al.
2018/0158036 A1 6/2018 Zhou et al.
2018/0165131 A1 6/2018 O'Hare et al.
2018/0189753 A1 7/2018 Konda et al.
2018/0191503 A1 7/2018 Alwar et al.
2018/0218176 A1 8/2018 Voorhees et al.
2018/0285217 A1 10/2018 Smith et al.
2018/0294967 A1 10/2018 Roberts et al.
2018/0343114 A1 11/2018 Ben-Ari
2019/0012660 A1 1/2019 Masters
2019/0012662 A1 1/2019 Krellenstein et al.
2019/0034923 A1* 1/2019 Greco ................. G06Q 20/389
2019/0102756 A1 4/2019 Zhou et al.
2019/0158275 A1 5/2019 Beck
2019/0164153 A1 5/2019 Agrawal et al.
2019/0165943 A1 5/2019 Chari et al.
2019/0173854 A1 6/2019 Beck
2019/0190701 A1 6/2019 Mitra et al.
2019/0238525 A1 8/2019 Padmanabhan et al.
2019/0286102 A1 9/2019 Carbone et al.
2019/0299105 A1* 10/2019 Knight ................. H04L 9/3247
2019/0303541 A1 10/2019 Reddy et al.
2019/0370792 A1* 12/2019 Lam ....................... H04L 9/085
2020/0013118 A1 1/2020 Treat et al.
2020/0059361 A1 2/2020 Konda et al.
2020/0059362 A1 2/2020 Brody et al.
2020/0067907 A1 2/2020 Avetisov et al.
2020/0074518 A1 3/2020 Kumaraswamy et al.
2020/0076615 A1 3/2020 Redpath et al.
2020/0127833 A1 4/2020 Konda et al.
2020/0127834 A1 4/2020 Westland
2020/0159847 A1 5/2020 Smith et al.
2020/0160319 A1 5/2020 Smith et al.
2020/0175623 A1 6/2020 Howie
2020/0193425 A1 6/2020 Ferenczi et al.
2020/0193429 A1 6/2020 Babar et al.
2020/0234386 A1 7/2020 Blackman et al.
2020/0275273 A1 8/2020 Smith et al.
2020/0322154 A1 10/2020 Konda et al.
2020/0327100 A1 10/2020 Androulaki et al.
2020/0327112 A1 10/2020 Glickshtein
2020/0328890 A1 10/2020 Connor
2020/0328894 A1 10/2020 Baker
2020/0328899 A1 10/2020 Glickshtein
2020/0410460 A1 12/2020 Nissan et al.

FOREIGN PATENT DOCUMENTS

CN 109359948 A 2/2019
WO WO 2017/187395 11/2017
WO WO 2018/007828 1/2018
WO WO 2018/028777 2/2018
WO WO 2018/144302 8/2018
WO WO-2019180702 A1 9/2019

OTHER PUBLICATIONS

Parno, B. et al., "Pinocchio: Nearly practical verifiable computation," S&P (2013), 16 pages.

Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).

Ben-Sasson, E. et al., "Scalable, transparent, and post-quantum secure computational integrity," Cryptology ePrint Archive, Report 2018/046 (2018), 83 pages.

Wu, H., "Dizk: Distributed zero-knowledge proof systems," In USENIX Security (2018), 35 pages.

Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).

Zhang, Y. et al., "Z-Channel: Scalable and efficient scheme in zerocash," 2017, [Online], Retrieved from the Internet: https://eprint.iacr.org/2017/684, pp. 1-39.

International Search Report and Written Opinion for International Application No. PCT/US2019/046532, mailed Dec. 2, 2019, 9 pages.

International Search Report and Written Opinion for International Application No. PCT/US2019/046808, mailed Dec. 2, 2019, 10 pages.

Kosba, A. et al., "Hawk: The Blockchain Model of Cryptography and Privacy-Preserving Smart Contracts," 2016 IEEE Symposium on Security and Privacy, May 2016, pp. 839-858.

Office Action for U.S. Appl. No. 16/283,452, mailed Nov. 6, 2019, 34 pages.

Office Action for U.S. Appl. No. 16/283,452, mailed Jul. 10, 2019, 31 pages.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

International Search Report and Written Opinion for International Application No. PCT/EP2020/060629, mailed Jun. 25, 2020, 9 pages.

International Search Report and Written Opinion for International Application No. PCT/US2019/057246, mailed Feb. 4, 2020, 8 pages.

Office Action for U.S. Appl. No. 16/659,335, mailed Apr. 23, 2020, 12 pages.

Office Action for U.S. Appl. No. 16/659,335, mailed Aug. 13, 2020, 15 pages.

International Search Report and Written Opinion for International Application No. PCT/US2019/057262, mailed Jan. 24, 2020, 9 pages.

(56) References Cited

OTHER PUBLICATIONS

International Search Report and Written Opinion for International Application No. PCT/EP2020/060610, mailed Jul. 27, 2020, 17 pages.
Invitation to Pay Additional Fees and Partial International Search Report for International Application No. PCT/EP2020/060623, mailed Jun. 17, 2020, 12 pages.
International Search Report and Written Opinion for International Application No. PCT/EP2020/060623, mailed Aug. 7, 2020, 16 pages.
Bunz, B. et al., "Zether: Towards privacy in a smart contract world," IACR, International Association for Cryptologic Research, vol. 20190226:031535, Feb. 20, 2019, Retrieved from the Internet: <URL:http://eprint.iacr.org/2019/191.pdf>, Retrieved on Feb. 20, 2019, 49 pages.
Clifton, M., "Understanding Merkle Trees—Why use them, who uses them, and how to use them," [Online], www.codeproject.com, pp. 1-31 (2017).
Dinh, T. T. A. et al., "Blockbench: A framework for analyzing private blockchains," [Online], Retrieved from the Internet: <URL: https://arxiv.org/abs/1703.04057>arXiv:1703.04057v1, Mar. 12, 2017, 16 pages.
Khalil, R. et al., "NOCUST—A securely scalable commit-chain," Feb. 15, 2019, Retrieved from the Internet: <URL:https://eprint.iacr.org/eprint-bin/getfile.plentry=2018/642&version=20190215:182502&file=642.pdf>, Retrieved on Mar. 10, 2020, 27 pages.
Lee, C. H. et al., "Implementation of IoT system using blockchain with authentication and data protection," 2018 International Conference on Information Networking (ICOIN), IEEE, Jan. 10, 2018, pp. 936-940.
Menezes, A. et al., "Key Management Techniques," Chapter 13 in Handbook of Applied Cryptography, CRC Press, Boca Raton, FL, (1996), pp. 543-590.
Jiang, Y. et al., "A privacy-preserving e-commerce system based on the blockchain technology," 2019 IEEE International Workshop on Blockchain Oriented Software Engineering (IWBOSE 2019), Hangzhou, China, Feb. 2019, pp. 50-55.
International Search Report and Written Opinion for International Application No. PCT/EP2020/060626, mailed Sep. 3, 2020, 12 pages.
Magazzeni, D. et al., "Validation and verification of smart contracts: A research agenda," Computer, vol. 50, No. 9, Sep. 2017, pp. 50-57.
Office Action for U.S. Appl. No. 16/383,845, mailed Apr. 25, 2022, 13 pages.
Office Action for U.S. Appl. No. 16/383,845 mailed Sep. 29, 2021, 11 pages.
Office Action for U.S. Appl. No. 16/534,858, mailed Jun. 23, 2021, 11 pages.
Office Action for U.S. Appl. No. 16/848,284, mailed Mar. 10, 2022, 11 pages.
Xu, L. et al., "DL-BAC: Distributed Ledger Based Access Control for Web Applications," 2017 International World Wide Web Conference Committee (IW3C2), WWW'17 Companion, Apr. 3-7, 2017, Perth, Australia; pp. 1445-1450.

* cited by examiner

METHODS AND SYSTEMS FOR IMPLEMENTING ZERO- KNOWLEDGE PROOFS IN TRANSFERRING PARTITIONED TOKENS ON DISTRIBUTED LEDGER-BASED NETWORKS

CROSS-REFERENCE TO RELATED PATENT APPLICATION

This application claims priority to and the benefit of U.S. Provisional Application No. 62/719,636, filed Aug. 18, 2018, entitled "Methods and Systems of ZKP-Based Secure PE Transactions on Public Networks," and U.S. Provisional Application No. 62/748,002, filed Oct. 19, 2018, entitled "Methods and Systems of ZKP-Based Secure Private Enterprise Transactions on Public Networks," both of which are incorporated herein by reference in their entirety.

FIELD OF THE DISCLOSURE

The transparency and consensus-based verification mechanisms employed in distributed ledger-based networks (DLNs) to validate actions occurring on the DLNs can compromise the privacy of the actions and the involved parties, as relevant information has to be shared with at least a substantial portion of the participants of the DLNs for the actions to be validated. The instant disclosure illustrates how the privacy, efficiency and security of such actions can be enhanced with the use of zero-knowledge proofs (ZKPs) that can be used to verify the validity of at least some aspects of the actions without necessarily publicly revealing private information related to the actions.

BACKGROUND

Organizations can use private networks as well as public networks such as the internet and distributed ledger-based networks (DLNs) to manage and track the production and shipping of large quantities of items or assets. The use of private networks, however, can be inefficient and costly, while public networks may not provide the desired level of privacy and/or security. For example, public DLNs can expose, by virtue of being public networks, details of private interactions occurring on the networks.

SUMMARY

Figure 1:
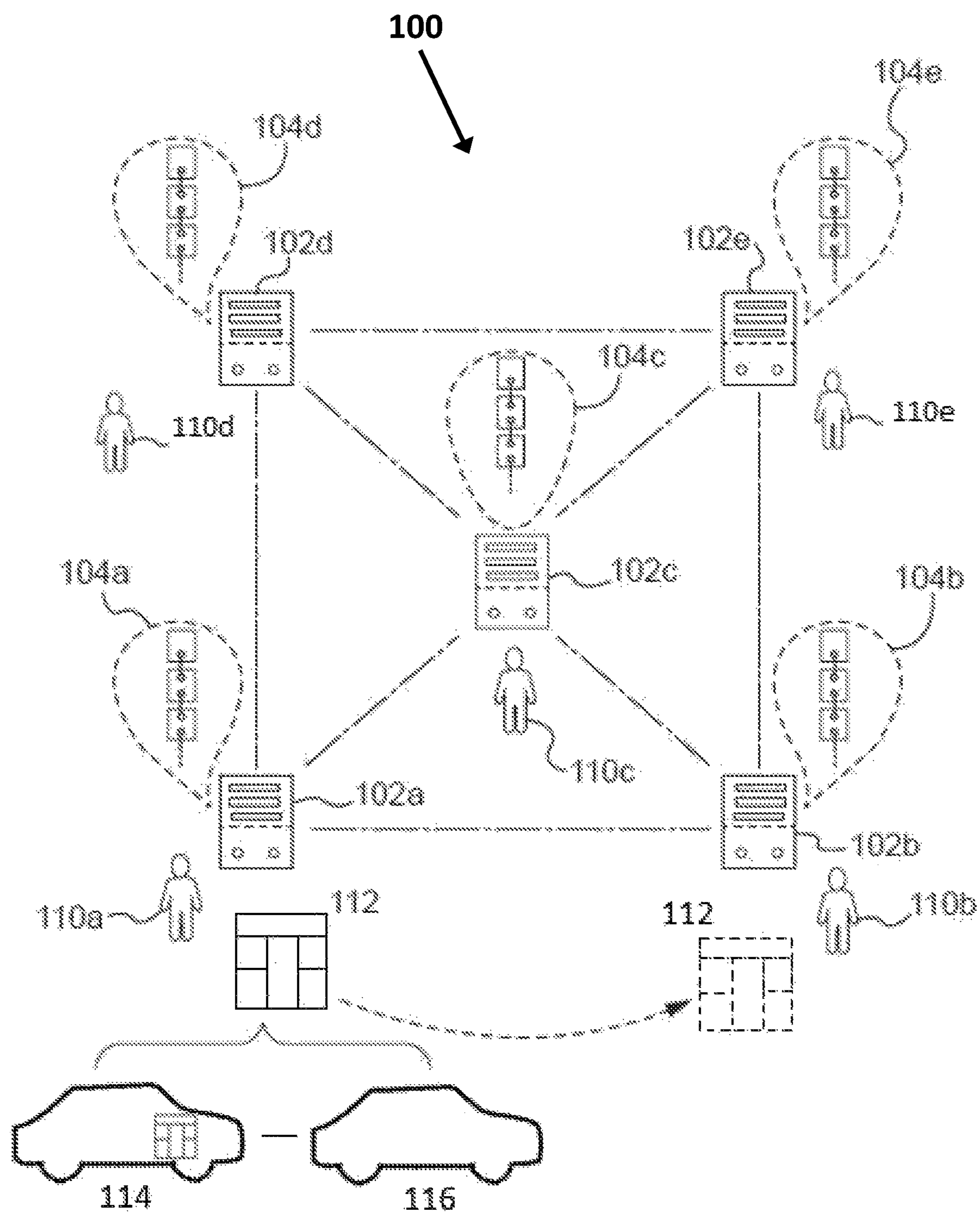
FIG. 1 shows a zero knowledge proof-enabled distributed ledger-based network configured for use in managing and conducting a private transaction between two parties that are participants of the network, according to some embodiment.

Some embodiments of the current disclosure disclose methods and systems that are directed at enhancing the privacy of participants on zero knowledge proof (ZKP)-enabled distributed ledger-based networks (DLNs), as well as facilitating interactions thereof, during actions conducted on the ZKP-enabled DLNs. For example, the actions may include representing the transfer of an asset from a sender to a recipient, where the asset is a constituent or part asset split or partitioned from a combined or composite asset, and is represented on the ZKP-enabled DLN by a constituent asset token commitment. In such embodiments, the methods may include the steps of: receiving a request that is configured to cause a transfer of a first asset from a sender to a recipient, the first asset being part of a combined asset that includes the first asset and a second asset; obtaining, upon receiving the request, a first asset token of the first asset, a combined asset token of the combined asset including a combination of the first asset token and a second asset token of the second asset; generating, on a DLN, a token commitment representing the first asset and not the second asset via an application of a hashing function on the first asset token of the first asset; providing, from a provider and to a self-executing code segment on the DLN, a ZKP that the provider has knowledge of an identity of the first asset token of the first asset; and receiving, after verification of the ZKP by the self-executing code segment, a confirmation confirming an addition of the token commitment onto a commitments data structure of the DLN.

DETAILED DESCRIPTION

In some embodiments, parties participating in a transaction may elect to use a public distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction for a sale of a digital music file can use a self-executing code or program (e.g., a smart contract) on the DLN (e.g., a blockchain network) to manage the sale of the music file. The self-executing code or smart contract can regulate the exchange of the music file and the correct payment for the file between the parties without involvement from a third party. In some embodiments, the DLNs can also be used to manage transactions involving physical (e.g., non-digital) assets. In some implementations, this can be accomplished by using token commitments to represent the assets, and a sale of an asset can be represented by the transfer of the token commitments representing the asset from one party (e.g., the seller) to a second party (e.g., the buyer).

In some embodiments, a DLN can be and/or support a blockchain network. Throughout the instant disclosure, in some embodiments, the terms "distributed ledger-based network" and "blockchain network" may be used interchangeably. Similarly, in some embodiments, the terms "self-executing code" or "self-executing code segment" and "smart contract" may be used interchangeably. Further, in some embodiments, the term "transaction" may be used to refer to off-chain transactions (e.g., transactions involving the sale of physical or digital assets between parties) and/or on-chain representation of these off-chain transactions (e.g., the transaction of token commitments that represent the assets on the blockchain network). Whether the term refers to the former or the latter case should be clear from context. The terms "off-chain" or "off-the DLN" are to be understood to mean "not on the blockchain network" or "not on the DLN." For example, if a statement such as "the application of a hashing function is performed off-the DLN" is to be understood as meaning "the application of the hashing function is not performed on the DLN (and is performed elsewhere)".

As noted above, in some embodiments, the trust the distributed ledger-based networks provide with no need for supervision by a central authority derives from the transparency of the networks to at least all the participants of the network (and in the case of public networks, to the public at large). This transparency, however, can reduce or even eliminate any privacy or confidentiality that participants need or seek when interacting with the network or its participants. For example, in the case of public networks, any interested person can access and inspect the distributed ledgers on the networks to obtain detailed information on all transactions that are represented on the ledgers since the inception of the networks (as the ledgers are, in at least most cases, largely immutable). In some implementations, the lack of privacy or confidentiality can render the use of a public ledger-based network untenable. For instance, a pharmacy using a public blockchain network to manage the fulfillment of orders for shipment of prescription drugs without a mechanism to conceal at least some aspects of the transaction would publicly expose personal and health-related data of its customers (thereby violating their privacy and possibly health privacy laws).

In some cases, private DLNs can be used to provide participants a measure of privacy that may not be available on public networks. The privacy afforded by private (non-ZKP-enabled) DLNs, however, can be far from adequate for most purposes (how ZKPs can be used to provide privacy in private and/or public blockchain networks will be discussed in details below). For example, with reference to the above example, the personal and health-related data of customers would still be available for inspection by other members of the private non-ZKP-enabled DLN (even if the data may be hidden from the public). Further, private non-ZKP-enabled DLNs would be burdensome to maintain as, amongst other reasons, applications developed for public blockchain networks would not seamlessly interoperate on private non-ZKP-enabled blockchain networks.

The inefficiency and cost associated with private non-ZKP-enabled DLNs may be illustrated with reference to the internet, which suffers from several privacy and security-related ills due to the openness of the network to anyone capable of accessing the network. Setting up a "private" intranet network can be one way to combat the noted privacy and security-related ills. Such private networks, however, are likely to severely lag in their developments, and even then to be costly to maintain, compared to the open internet, as the closed nature of the private networks would limit interoperability of applications developed for the open or public internet. Analogously, a private DLN would lag in its development compared to a public DLN and may still be costly to maintain. One or more embodiments described herein disclose methods and systems that are directed at providing enhanced privacy, efficiency and security to DLNs via the implementation of ZKPs in the DLNs. It is to be noted that, although descriptions of these embodiments refer to public DLNs, the methods and systems equally apply to private DLNs.

In some embodiments, as noted above, the current disclosure discloses methods and systems that provide privacy to participants of a transaction on a ZKP-enabled DLN while retaining the level of trust afforded by decentralized networks (i.e., with no central authority) such as DLNs. For example, one or more of the methods and systems disclosed herein allow for the identities of parties to a transaction (e.g., a sale or transfer of an asset between the parties) as well as details of the transaction (e.g., details of the assets being transferred) to remain secret when a public blockchain network is used to manage the transaction. Referring to the example provided above, one or more of the disclosed methods and systems allow the pharmacy to use a public blockchain network to facilitate the shipment of the drugs without revealing on the blockchain network (or publicly) any identifying information related to the assets (i.e., the drugs), the sender (i.e., the pharmacy) and/or the recipient of the assets (i.e., the clients), while depending on the trust afforded by the blockchain network at least partly as a result of the transparency inherent to public blockchain networks. In such examples, the sender and the recipient may be represented by their respective public keys on the blockchain network.

In some embodiments, the disclosed methods and systems facilitate the actions represented on ZKP-enabled DLNs while still retaining the level of trust afforded by decentralized networks as noted above. In some implementations, an action may be a transaction involving the transfer of a part or component of a larger combined asset between participants of the DLN, and the transferor may wish to split the combined asset into multiple parts and transfer (e.g., ship) the desired constituent asset or assets to a transferee (e.g., a purchaser). For example, an owner of a damaged or totaled vehicle may receive a purchase order for the engine of the vehicle, and the owner may be willing to sell the engine separately from the rest of the damaged vehicle. In such cases, the owner may initially tokenize the whole vehicle (if not already done so), and then proceed to tokenize the engine and the rest of the damaged vehicle separately. The asset token that identifies the whole vehicle may be a combination of the asset token identifying the engine and the asset token identifying the rest of the damaged vehicle. In allowing the splitting of a combined or composite asset into constituent assets that can be transferred separately, such embodiments can facilitate transactions (e.g., transfers of assets) to be represented on the ZKP-enabled DLN. That is, a user of the disclosed ZKP-enabled DLN can use the methods and systems disclosed herein to facilitate the partitioning or splitting of a combined or composite asset into multiple constituent assets prior to transferring at least one of the constituent assets to a participant, as the disclosed methods and systems allow one to represent the multiple constituent assets and their transfers on the ZKP-enabled DLN. In some implementations, one or more of the rest of the constituent assets may be transferred to the same participant or to other participants of the ZKP-enabled DLN.

In some implementations, the actions may be the actions of a single participant that uses the ZKP-enabled DLN to, amongst other things, manage an inventory (e.g., without necessarily transferring the constituent assets to a recipient). For example, the DLN participant may be a retailer that receives a large amount of wholesale products (i.e., bulk products) that usually are partitioned or split into multiple (e.g., individualized) components before the components are made available to customers. In such examples, the retailer may tokenize the bulk product (i.e., the combined asset) as well the multiple components that the bulk product (i.e., the constituent assets) would be split into, and the asset token identifying the bulk product may be a combination of the asset tokens identifying the multiple components. In some implementations, the retailer may generate the constituent asset tokens identifying the multiple components by hashing or applying a hashing function or algorithm on one or more identifying parameters of the multiple components. The retailer may then combine the constituent asset tokens of the multiple components to generate the combined asset token for the combined asset (e.g., the bulk product). For example, the constituent asset tokens may be generated by applying a hashing function or algorithm on an identifying parameter such as but not limited to the serial number of each bulk product, and the combined asset token may be generated by combining the asset tokens of the constituent assets (e.g., the multiple components into which the bulk product is split). Alternatively or in addition, the combined asset token may be generated by hashing identifying parameters of the bulk asset.

As an illustrative example of an embodiment, the generation of a combined asset token is performed as follows: given a multi-component (i.e., combined), subdividable asset, a partition basis for the multi-component, subdividable asset is identified (e.g., a dimension or other description of a constituent component (for example, a smallest constituent component) of the multi-component, subdividable asset). The representation, or "token," for the multi-component, subdividable asset can then be constructed by generating or identifying parameters associated with each constituent component (e.g., represented by an associated j son object, e.g., {"constituentID":"1234", "constituent_description": "ABCD," "constituent_name": "EFGH," "constituent_attribute(s)":"IJKL," etc.) and hashing the parameters associated with each constituent component to produce unique representations of the constituent components. In some such embodiments, parameters associated with a container or other structure containing or connecting the constituent components are also generated or identified, and hashed to produce one or more unique representations thereof. All generated hashes (i.e., of the constituent components, or of the constituent components and of the container or other structure containing or connecting the constituent component) can then be combined, for example in a tree structure (e.g., a hierarchical tree structure or other accumulating structure), and hashed to produce the combined asset token. In some implementations, a representation of a manner in which the constituent components are arranged or connected within the multi-component, subdividable asset is also identified and hashed, such that the hash thereof is also included as part of the combined asset token (e.g., increasing the uniqueness of the representation of the multi-component, subdividable asset).

In some embodiments, the generation of a combined asset token is performed off-chain (i.e., not on the blockchain), such that the first reference on the blockchain to the combined asset or any of its components is a reference to the combined asset token itself. At a later time, the constituent components of the combined asset may be identified by "deconstructing" the combined asset token, and optionally recombined in different ways (e.g., subsets of the constituent components may be joined to form other combined assets with associated tokens generated, for example, as discussed above).

In other embodiments, during the generation of a combined asset token, the hashing of the constituent components can be performed on-chain (i.e., "minted" on the blockchain). Subsequently, the combination of the hashed constituent components and/or hashing of the combined constituent component hashes can also be performed on-chain.

By using the foregoing asset tokens on the ZKP-enabled DLN as discussed below, in some embodiments, a DLN participant such as a retailer can use the ZKP-enabled DLN to manage the inventory of wholesale or bulk products as well as constituent products into which the bulk products are split. In some embodiments, as mentioned above, the ZKP-enabled DLN can also be used to transfer the constituent assets or products to another participant on the ZKP-enabled DLN.

FIG. 1 shows a ZKP-enabled DLN configured for use in managing and representing a private transaction between two parties that are participants of the network, in particular a public network, according to some embodiment. In some embodiments, the ZKP-enabled DLN or blockchain network 100 includes a plurality of computing nodes 102*a*-102*e* configured to communicate amongst each other via a peer-to-peer (P2P) connection. In some implementations, the computing nodes 102*a*-102*e* can be computing devices including but not limited to computers, servers, processors, data/information processing machines or systems, and/or the like, and may include data storage systems such as databases, memories (volatile and/or non-volatile), etc. In some implementations, the P2P connections may be provided by wired and/or wireless communications systems or networks such as but not limited to the internet, intranet, local area networks (LANs), wide area networks (WANs), etc., utilizing wireless communication protocols or standards such as WiFi®, LTE®, WiMAX®, and/or the like.

In some embodiments, the ZKP-enabled DLN 100 may include self-executing codes or smart contracts that are configured to execute upon fulfillment of conditions that are agreed upon between transacting parties. For example, some or all of the computing nodes 102*a*-102*e* may include copies of a self-executing code that self-execute upon fulfillment of the conditions. In some implementations, the computing nodes 102*a*-102*e* may communicate with each other to exchange the results of the executions of their respective self-executing codes so that at least a substantial number or percentage of the computing nodes 102*a*-102*e* arrive at a consensus on the results. In some implementations, one or a few of the computing nodes 102*a*-102*e* may have self-executing codes that self-execute, and the results would be transmitted to the rest of the computing nodes 102*a*-102*e* for confirmation.

In some embodiments, a self-executing code or a smart contract can facilitate the completion of transactions on the ZKP-enabled DLN 100 by providing the transacting parties confidence that the other party would deliver the promised product or payment. For example, with reference to the above example related to the sale of a digital music file, a smart contract can be used to verify that the seller of the file is in fact an owner of the file, the buyer of the music file has adequate resource to pay for the music, etc. Further, the smart contract can facilitate the exchange of the music file by allowing the transfer of a payment to occur only after the transfer of the music file is completed (and validated).

In some embodiments, the ZKP-enabled DLN 100 may be linked to one or more oracles (not shown) or data feeds that provide external data to the ZKP-enabled DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, etc., and an oracle may provide the requisite information to the smart contract facilitating the transaction. The smart contract, upon receiving the information, may self-execute after determining that the condition for the transaction has been fulfilled. In some embodiments, the oracles may facilitate for the smart contracts to send data out to external systems. For example, a smart contract may be configured to send out information to a smartphone when an account on the ZKP-enabled DLN 100 receives a payment, and an oracle may serve as a transit hub for the data including the information during its transmission to the smartphone.

In some embodiments, at least a substantial number of the computing nodes 102*a*-102*e* include copies of a distributed ledger 104*a*-104*e* onto which transactions that occur on the network are recorded. The recording of the transactions on the distributed ledger 104*a*-104*e* may occur when some substantial proportion of the computing nodes 102*a*-102*e*, or a subset thereof, agree on the validity of the transactions. The distributed ledger 104*a*-104*e* can be immutable or nearly immutable in the sense that to alter the distributed ledger 104*a*-104*e*, at least this substantial portion of the computing nodes 102*a*-102*e* would have to agree, which can be increasingly difficult when the number of computing nodes 102*a*-102*e* is large (and the distributed ledger 104*a*-104*e* gets longer).

As noted above, the ZKP-enabled DLN 100 can be used to facilitate transactions that involve digital assets (e.g., sale of digital music files). In some embodiments, the ZKP-enabled DLN 100 can also be used to facilitate transactions of assets that occur off-chain or off-line (e.g., transactions of physical assets) such as, but not limited to, the aforementioned selling of drugs by a pharmacy or a vehicle by a car manufacturer. In some implementations, a physical off-chain asset can be tokenized by cryptographically hashing one or more identifying parameters of the physical off-chain asset to generate an asset token that can serve as a unique asset identifier of the physical off-chain asset. In some implementations, these off-chain assets can be represented by token commitments on the ZKP-enabled DLN 100, and the sale or transfer of the off-chain assets can be represented on the ZKP-enabled DLN 100 by the transfer of the token commitments between the blockchain accounts of the transacting parties.

In some implementations, the types of asset tokens that can be used as asset identifiers and/or token commitments that can be used to represent the off-chain assets can depend on the nature of the assets themselves. For example, fungible products (e.g., some amount of gasoline or a currency) can be identified with fungible asset tokens while non-fungible products (e.g., distinguishable products such as a product with a serial number) can be identified by non-fungible asset tokens. In such implementations, the token commitments that represent the non-fungible assets on the ZKP-enabled DLN 100 would be representing or be related to non-fungible asset tokens that identify the non-fungible assets. In some implementations, the token commitments that represent fungible assets on the ZKP-enabled DLN 100 would be representing or be related to fungible asset tokens that identify the fungible assets.

FIG. 1 shows an example embodiment of a transaction that involves the sale of an off-chain asset (e.g., a vehicle part or component 112) from a first transaction participant 110*a* to a second transaction participant 110*b*. In such example, the vehicle part 112 may be represented on the ZKP-enabled DLN 100 with a non-fungible token commitment that can be transferred from the first transaction participant 110*a* to the second transaction participant 110*b* to represent the sale or transfer of the vehicle part 112 during the transaction between the two parties. In some embodiments, asset tokens and/or token commitments may be stored off-chain, i.e., off of the ZKP-enabled DLN 100. For example, asset tokens and/or token commitments may be stored in storage systems or databases that are linked with the ZKP-enabled DLN 100. For instance, if the ZKP-enabled DLN 100 is a ZKP-enabled Ethereum blockchain network, the asset tokens and/or token commitments may be stored in the Swarm database. In some embodiments, the asset tokens and/or token commitments may be stored on the ZKP-enabled DLN 100 (e.g., in the storage systems associated with the computing nodes 102*a*-102*e*).

In some embodiments, as noted above, transactions that occur on the ZKP-enabled DLN 100 (including off-chain transactions that are represented on the ZKP-enabled DLN 100 with the use of asset tokens or token commitments, for example) are recorded onto at least a substantial number of the distributed ledgers 104*a*-104*e* that exist on the ZKP-enabled DLN 100. For example, a transaction between a first transaction participant 110*a* and a second transaction participant 110*b* on the ZKP-enabled DLN 100 representing the transfer of an off-chain asset 112 from the former to the latter would be recorded on all or nearly all of the distributed ledgers 104*a*-104*e* once the transaction details are accepted as valid by the participants of the ZKP-enabled DLN 100. In the case of a blockchain network that is not ZKP-enabled, however, the first transaction participant 110*a* and the second transaction participant 110*b* are afforded little or no privacy as all or nearly all the details of the transaction are made public or visible to all that have access to the blockchain network (the public, in case of public blockchains), such details including confidential information on the transacting participants, the asset being transacted, the asset tokens used to identify the asset on the blockchain network, and/or the like. In some embodiments, the present disclosure discloses methods and systems directed at providing privacy and ease to transactions that occur, or are represented on public blockchains, with the use of zero knowledge proofs (ZKPs).

In some embodiments, the off-chain asset 112 may be a part or component of a composite or combined asset 114, and the first transaction participant 110*a* may obtain this constituent asset 112 from the combined asset 114 before transferring the constituent asset 112 to the second transaction participant 110*b*. For example, the first transaction participant 110*a* may be an owner of a damaged vehicle 114 that has received an order for a part of the vehicle (e.g., the engine) and the manufacturer may obtain the engine (i.e., the constituent asset 112) from the vehicle (i.e., the combined asset 114) by taking the engine apart from the vehicle. In some embodiments, the combined asset 114 can be partitioned or split into multiple constituent assets 112, 116 (e.g., two assets, three assets, four assets, etc.). In such embodiments, one or more of the multiple constituent assets 112, 116 may be transferred to the first transaction participant 110*a* while the rest of the multiple constituent assets 112, 116 may not be transferred to the second transaction participant 110*b*, to the other participants of the ZKP-enabled DLN 100 or may not be transferred at all (e.g., kept by the first transaction participant 110*a*).

In some embodiments, the first transaction participant 110*a* may tokenize the combined asset 114 and/or its constituent assets 112, 116 by cryptographically hashing one or more identifying parameters of the combined asset 114 and/or its constituent assets 112, 116, respectively, to generate respective asset tokens that can be used as identifiers for the assets. Further, the combined asset 114 and/or its constituent assets 112, 116 may be represented on the ZKP-enabled DLN 100 using token commitments that can be generated using the asset tokens of the combined asset 114 and/or its constituent assets 112, 116, respectively. In some instances, the generation of the asset tokens and/or the token commitments may be performed off-chain, i.e., off of the ZKP-enabled DLN 100. In some implementations, the first transaction participant 110*a* may represent the transfer of the constituent asset 112 to the second transaction participant 110*b* by transferring the token commitment of the constituent asset 112 to the second transaction participant 110*b*. In some embodiments, the generation of the asset tokens and/or the token commitments to identify and/or represent on the ZKP-enabled DLN 100 the combined asset 114 and/or its constituent assets 112, 116 may be accomplished with the use of ZKPs. In some implementations, ZKPs can be used to enhance the privacy, ease and efficiency of the process to divide the combined asset into the constituent assets 112, 116 and transfer one or more of the constituent assets 112, 116 to the second transaction participant 110*b*. For example, the use of ZKPs in such cases may allow the first transaction participant 110*a* to keep as secret some or all of the details related to the constituent assets 112, 116, the combined asset 114, the first transaction participant 110*a*, the second transaction participant 110*b*, and/or the like (thereby significantly enhancing the privacy level afforded to participants of the ZKP-enabled DLN 100).

In some embodiments, ZKPs can be used by a first entity, the "prover" or "provider" of the proofs, to convince a second entity, the "verifier" of the proofs, that a statement about some secret information is truthful without having to reveal the secret information to the verifier. ZKPs can be interactive, i.e., require interaction from the prover for the verifier to verify the truthfulness of the statement. In some embodiments, the ZKPs can be non-interactive, requiring no further interaction from the prover for the verifier to verify the statement. Examples of non-interactive ZKPs include zero-knowledge succinct non-interactive argument of knowledge (zk-SNARK), zero-knowledge scalable transparent argument of knowledge (zk-STARK), etc. Discussions of ZKPs, zk-SNARK, zk-STARK, etc., can be found in U.S. Patent Publication No. 2011/0246779, which is incorporated by reference herein in its entirety. Additional example discussions of zero knowledge protocols and the construction of SNARKs and STARKs can be found, for example, in "Scalable, transparent, and post-quantum secure computational integrity," by E. Ben-Sasson, et al., Mar. 6, 2018; "Snarky Signatures: Minimal Signatures of Knowledge from Simulation-Extractable SNARKs," by J. Groth, et al., *Advances in Cryptology-CRYPTO* 2017 *proceedings*, Aug. 20-24, 2017; and "Pinocchio: Nearly Practical Verifiable Computation," by B. Parno, et al., *Proceedings of the* 34*th* *IEEE Symposium on Security and Privacy*, 2013, the entire contents of each of which are herein incorporated by reference in their entireties for all purposes.

Figure 2:
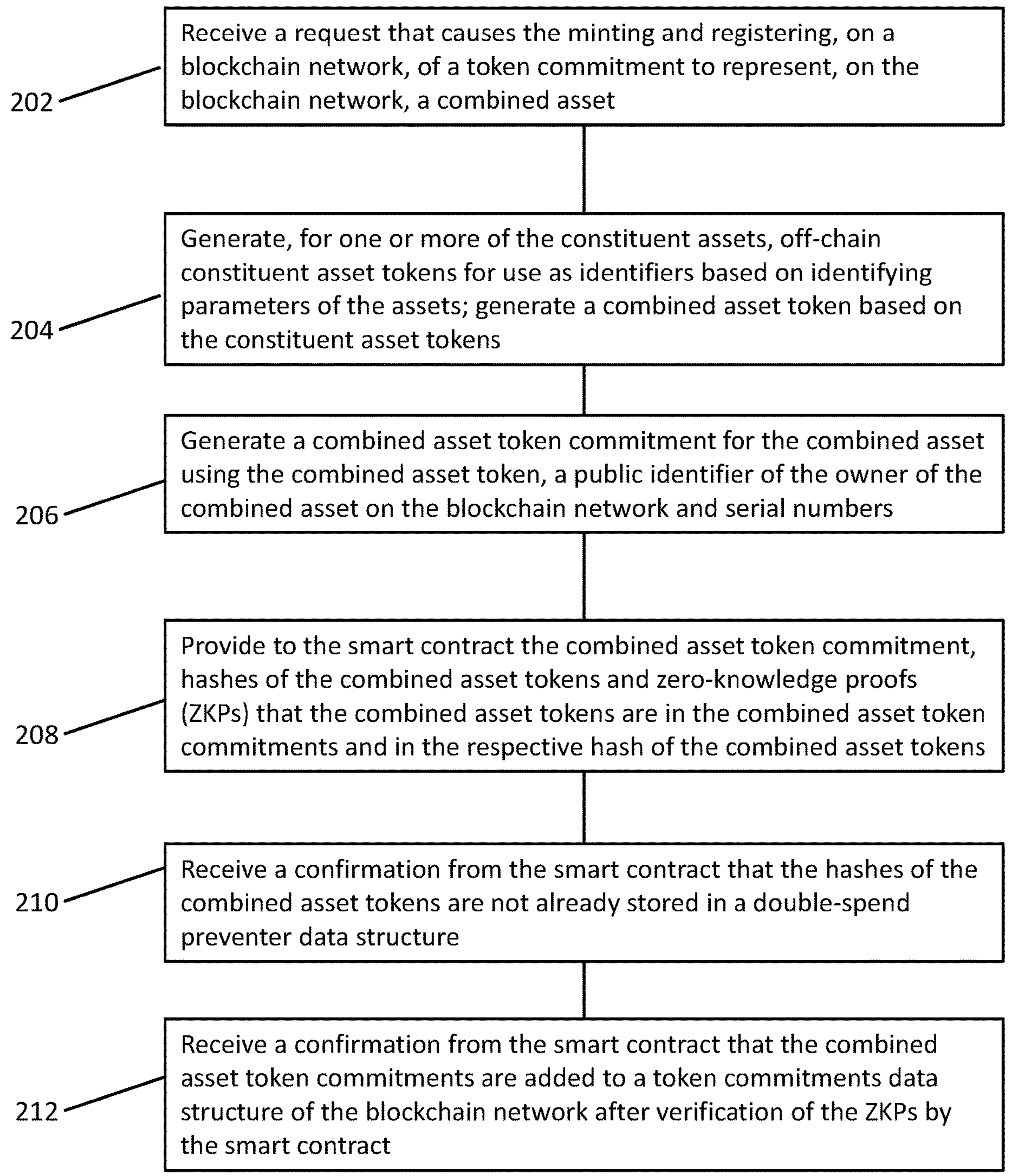
FIG. 2 shows a flow chart illustrating the minting of a token commitment on a distributed ledger to represent a real world or physical asset on the distributed ledger, according to some embodiment.

FIG. 2 shows a flow chart illustrating the steps of minting token commitments on a distributed ledger to represent real world or physical assets on the ZKP-enabled DLN 100, according to some embodiment. In some embodiments, an owner 110*a* of the combined asset 114 may wish to partition or split the combined asset 114 into constituent assets 112, 116 (for example, to separately transfer one or more of the constituent assets 112, 116 to a second participant 110*b* on the on the ZKP-enabled DLN 100). In such embodiments, the owner 110*a* of the combined asset 114 may use the ZKP-enabled DLN 100 to manage the transfer by representing the constituent assets 112, 116 and/or the combined asset 114 on the ZKP-enabled DLN 100. For example, the owner 110*a* may generate a combined asset token commitment for the combined asset 114 and have the combined asset token commitment registered or minted on the ZKP-enabled DLN 100 as a representation of the combined asset 114, as described below in detail. In such example, the combined asset token commitment would encode ownership information that indicates that the owner 110*a* owns the combined asset 114. Further, also as discussed in detail below, the owner 110*a* may generate constituent asset token commitments for the one or more of the constituent assets 112, 116 and have these constituent asset token commitments registered or minted on the ZKP-enabled DLN 100 as representations of the one or more constituent assets 112, 116. The ownership information encoded in the constituent asset token commitments would indicate, however, that the one or more constituent assets 112, 116 belong to the second participant 110*b* to which the one or more constituent assets 112, 116 are transferred.

For example, the combined asset 114 may be a vehicle and the owner may wish to take apart the vehicle and sell the parts to different customers. That is, the owner may wish to partition the combined asset 114 (e.g., the vehicle) into multiple constituent assets 112, 116, and in some cases, transfer one or more of the multiple constituent assets 112, 116 to one or more of the participants of the ZKP-enabled DLN 100. For instance, the owner may wish to transfer constituent asset 112 to the second participant 110*b* while keeping the rest of the constituent assets 116 or transferring these constituent assets 116 to other participants of the of the ZKP-enabled DLN 100 (or even the second participant 110*b*).

In such embodiments, to use ZKP-enabled DLN 100 to manage the transfer of the vehicle parts to other participants of the ZKP-enabled DLN 100, the owner 110*a* may wish to represent both the constituent assets 112, 116 and/or the combined asset 114 on the ZKP-enabled DLN 100. For example, a token commitment for each constituent asset 112, 116 and/or for the combined asset 114 may be generated to represent, respectively, the constituent assets 112, 116 and/or for the combined asset 114 on the ZKP-enabled DLN 100. In such implementations, the token commitments for the constituent assets 112, 116 would indicate that the constituent assets 112, 116 belong to the recipient (e.g., the second participant 110*b*) to which the assets are transferred while the token commitments for the combined asset 114 would indicate that the assets belong to the owner (e.g., the first participant 110*a*). As will be discussed in more details below, token commitments can be viewed as tokens that represent assets on the ZKP-enabled DLN 100 while encoding information about the ownership of the assets. In some implementations, token commitments represent assets on the ZKP-enabled DLN 100 by also including or encoding information that relates to the asset. For example, token commitments can be tokens that include or encode asset and/or owner identifiers, and the addition of the token commitments onto a commitments data structure of the ZKP-enabled DLN 100 may be viewed as a registration of the asset (and its ownership) on the ZKP-enabled DLN 100.

In some embodiments, the combined asset token commitment that represents the combined asset 114 on the ZKP-enabled DLN 100 may be generated using the combined asset token of the combined asset 114, which in turn can be generated by combining the constituent asset tokens of the constituent assets 112, 116. As such, to represent the combined asset 114 on the ZKP-enabled DLN 100 (and if desired the transfer of one or more of the constituent assets 112, 116 from the first transaction participant 110*a* to the second transaction participant 110*b*), in some implementations, the first transaction participant 110*a* may first generate constituent asset tokens for the constituent assets 112, 116, which may then be combined to generate the combined asset token of the combined asset 114.

In some embodiments, the asset tokens can be examples of asset identifiers that uniquely identify the assets without exposing the identities of the assets. For example, the first transaction participant 110*a* (referred hereinafter as the sender 110*a*) may generate, at 204 and using the computing node 102*a*, an asset identifier for each constituent asset 112, 116 that can serve as a unique identifier for the constituent asset while concealing the constituent asset's identity. In some implementations, the constituent asset identifiers may be generated in response to a request, at 202, to have the constituent assets 112, 116 represented on the ZKP-enabled DLN 100. For example, the sender 110*a* can generate, using the computing node 102*a* and for each asset of the constituent assets 112, 116, an alpha-numeric value that is uniquely associated with some identifying parameters (e.g., serial numbers, model numbers, etc.) of that constituent asset, and the alpha-numeric value can be used as the asset identifier that hides the real identity of that constituent asset (while still being used by the sender 110*a* as an identifier of that constituent asset).

As another example, a unique asset identifier can be generated for each constituent asset 112, 116 by cryptographically hashing the identifying parameters of that constituent asset to generate an asset token that can serve as the unique asset identifier. In some instances, the identifying parameter can uniquely identify a constituent asset because the constituent asset may be a non-fungible asset. The cryptographic hashing may include the application of a cryptographic hashing algorithm such as, but not limited to, the SHA-256 algorithm, on the identifying parameters. For instance, an asset token can be generated for one or more of the vehicle body without the engine 116, and a car engine 112 by applying a hashing function (e.g., SHA-256) on one or more of the identifying parameters of each constituent asset, including serial number(s) of the vehicle body, engine numbers, etc. Accordingly, the asset tokens can serve as unique asset identifiers for the respective constituent assets without exposing or revealing to other participants of the ZKP-enabled DLN 100 any of the identifying parameters of the constituent assets. In some embodiments, the hashing can occur off the ZKP-enabled DLN 100. For example, if the ZKP-enabled DLN 100 is a ZKP-enabled Ethereum blockchain network, in some implementations, the asset tokens can be generated and stored off the Ethereum blockchain network at the Swarm storage network/database.

In some embodiments, after generating the asset identifiers for the constituent assets 112, 116 (e.g., the constituent asset tokens of the constituent assets 112, 116), an asset identifier for the combined asset 114 may then be generated. For example, a combined asset token that identifies the combined asset 114 can be generated by combining the constituent asset tokens that identify the constituent assets 112, 116 of the combined asset. The resulting combined asset token, "B," can represent the constituent asset tokens in such a manner that it would be mathematically unique, and thus improbable (or computationally intractable) for any other combination of asset tokens to be combined to generate the same representation B. For example, in some implementations, the combined asset token B may be computed as follows: $B=A_1\| \ldots \|A_i\| \ldots \|A_n$, where $A_i$ is the constituent asset token identifying the $i^{th}$ constituent assets 112, 116 (e.g., the constituent asset token obtained by hashing, off-chain, at least some identifying parameters of the constituent asset 112, 116), i stands for the $i^{th}$ constituent asset 112, 116, and $\|$ represents a concatenation operator. Alternatively or in addition, the combined asset token B may be computed as the root of a tree data structure ("data tree"), such as a Merkle Tree, in which information related to the constituent asset tokens is stored in the "leaves" of the data tree and/or in nodes higher up in the data tree. Each constituent asset token optionally includes its own associated constituent asset tokens and, thus, can itself form the root of another tree data structure (e.g., a "sub-tree").

A Merkle Tree is an example of a cryptographic accumulator, which can be used to compress information into a representation of that information in such a way that no alternative combination of asset tokens would result in the same representation. Other example accumulators include an RSA accumulator and a bilinear-pairing-based accumulator. The constituent tokens may be accumulated through one or more of the foregoing mechanisms, and the combined asset token can represent the value of this 'accumulator' (i.e., the accumulation of multiple asset tokens results into a compressed representation of these asset tokens). This compressed representation can be referred to as the 'accumulator' or 'accumulated value', B).

Alternatively or in addition to the concatenation and the data tree methods discussed above, the combined asset token B may be computed as follows: $B=A_1\oplus \ldots \oplus A_i\oplus \ldots \oplus A_n$, where $A_i$ is the constituent asset token identifying the $i^{th}$ constituent assets 112, 116 (e.g., the constituent asset token obtained by hashing, off-chain, at least some identifying parameters of the constituent asset 112, 116), i stands for the $i^{th}$ constituent asset 112, 116, and $\oplus$ represents a combining operator (e.g., the XOR operator). In some embodiments, the combined asset token B and/or the constituent asset tokens $A_i$ may be generated and stored off-chain, i.e., off of the ZKP-enabled DLN 100. For example, the tokens may be generated and stored in storage systems or databases that are linked with the ZKP-enabled DLN 100. For instance, if the ZKP-enabled DLN 100 is a ZKP-enabled Ethereum blockchain network, the tokens may be generated and stored in the Swarm database.

At 206, as mentioned above, off-chain non-fungible assets (e.g., the combined asset 114) can be registered or represented on the ZKP-enabled DLN 100 for the first time by generating or minting non-fungible token commitments that encode at least some aspects of the non-fungible assets and/or the ownership of the assets on the ZKP-enabled DLN 100. In some embodiments, minting of a token commitment may refer to the registration or representation of an asset on the ZKP-enabled DLN 100 by a token commitment for the first time. As will be discussed below, new token commitments may be generated later to represent an asset that is already being represented on the ZKP-enabled DLN 100 by an existing token commitment. In such cases, however, the asset is being transferred to a new owner, and the generation of the new token commitment may be (in some cases, should be) accompanied by the nullification of the existing token commitment (which indicates that the asset does not belong to the initial owner anymore). In any case, whether an asset (e.g., non-fungible asset) is being registered or represented on the ZKP-enabled DLN 100 for the first time by the minting of a token commitment, or the transfer of the asset from one owner to another is being registered on the ZKP-enabled DLN 100 by the generation of a new token commitment, the minted token commitment and/or the new token commitment may encode at least some aspects of the asset and/or the ownership of the asset.

In some implementations, to encode at least some aspects of the non-fungible asset (e.g., the combined asset 114), a cryptographic hashing function or algorithm can be applied to the unique asset identifier of the asset such as the asset token For example, the combined asset token commitment for the combined asset 114 may be generated by applying a cryptographic hashing function or algorithm on the combined asset token of the combined asset 114, which allows the combined asset token commitment to encode at least some aspects of the combined asset 114. Further, to encode some aspects of the ownership of the asset, in some implementations, the cryptographic hashing function can also be applied to a public identifier on the ZKP-enabled DLN 100 that is associated with the owner (e.g., sender 110*a* when the sender 110*a* is minting the token commitment for the first time). An example of such public identifier includes the public key of the sender on the ZKP-enabled DLN 100 (e.g., the public key that is associated with the sender 110*a* on the ZKP-enabled DLN 100).

In some embodiments, the cryptographic hashing function can also be applied to a string of data/information (e.g., a hexadecimal string, an alphanumeric string, an ASCII string, etc.), such as a serial number. In some implementations, the string of data/information (e.g., serial number) can be used as a handle of the non-fungible token commitment independent of the non-fungible asset (e.g., encoded by the asset token) and/or its ownership (e.g., encoded by the public key). For example, as discussed below, the transfer of a physical asset to the recipient 110*b* can be represented by the generation and registration on the ZKP-enabled DLN 100 of a new token commitment that associates the asset with the new owner, the recipient 110*b*, and the nullification of the existing token commitment that associated the asset with the sender 110*a*. In such implementations, the token commitment handle (e.g., the serial number) can be used to nullify the existing token commitment, as discussed below.

In some embodiments, the minting of non-fungible token commitments to represent the combined asset 114 on the ZKP-enabled DLN 100 for the first time may include the computation of the combined asset token commitment (Z-token) as follows: $Z=H(S\|P_k\|B)$, where B is the combined asset token identifying the combined asset 114 (e.g., the combined asset token obtained by combining the constituent asset tokens of the constituent assets 112, 116), $P_k$ is the public key on the ZKP-enabled DLN 100 that is associated with the sender 110*a* (e.g., the current owner of the combined asset 114), S is a serial number, H is a cryptographic hashing function or algorithm (e.g., SHA-256), and || represents a concatenation operator.

In some embodiments, the computation of the combined asset token commitment Z may include application of the hashing function on additional elements besides or instead of S, $P_k$ and B. In some embodiments, the combined asset token commitment Z comprises or consists of a number (e.g., a serial number), a public identifier on the ZKP-enabled DLN 100 of the sender 110*a* (e.g., public key of the sender 110*a*) and an asset identifier (e.g., combined asset token B).

In some embodiments, the application of the hashing function to compute the Z-tokens (i.e., token commitments) allows for the generation or construction of the token commitments on the ZKP-enabled DLN 100 without revealing the identities of the serial numbers $S_i$, the combined asset token B on the ZKP-enabled DLN 100 (e.g., $S_i$ and B may be kept secret by the sender 110*a*, except when B is transmitted (privately) to the recipient 110*b* as discussed below during an asset transfer transaction).

After the combined asset token commitment Z is computed, at 208, the sender 110*a* may provide or publish, anonymously and using the computing node 102*a*, the combined asset token commitment Z and/or a hash of the combined asset token B, H(B), to a self-executing code or smart contract on the ZKP-enabled DLN 100 to have the token commitment (i.e., Z-token) minted or registered for the first time on the ZKP-enabled DLN 100. Prior to the Z-token Z being included in the token commitments data structure of the ZKP-enabled DLN 100 as a representation of the combined asset 114 on the ZKP-enabled DLN 100, however, in some embodiments, the sender 110*a* may have to demonstrate to the ZKP-enabled DLN 100 (e.g., to the smart contract of the ZKP-enabled DLN 100) that (1) the combined asset token commitment Z in fact includes the asset token B, and/or (2) the combined asset 114 is not already represented on the ZKP-enabled DLN 100, i.e., the Z-token Zhas not already been minted for the combined asset 114 on the ZKP-enabled DLN 100 (e.g., the latter condition may aid with avoiding "double minting," which can lead to undesirable "double spend" or "double transfer" on the ZKP-enabled DLN 100 of multiple token commitments all representing the same combined asset (or its constituent assets)).

In some implementations, the sender 110*a* may generate and provide anonymously to the smart contract, using the computing node 102*a* (and, e.g., by generating a zkSNARK), a ZKP (in this case, a Zero Knowledge Proof of knowledge of the preimage of a hash) that the combined asset token commitment (Z-token) Z includes the combined asset token B. Further, the ZKP may also include a proof that a hash of the combined asset token B, H(B), includes the combined asset token B. In some implementations, the hash H(B) can be used by the smart contract to verify that the asset identified by the combined asset token B is not already represented on the ZKP-enabled DLN 100. That is, as mentioned above and discussed in detail below, H(B) can be used to prevent undesirable "double spend" by prohibiting a future attempt to mint or register (e.g., for the first time) a new token commitment for the combined asset 114 identified by the combined asset token B while another valid token commitment for the same combined asset 114 exists on the ZKP-enabled DLN 100. In other words, in some embodiments, H(B) can be used to prevent the minting of a new token commitment to represent the combined asset on the ZKP-enabled DLN 100 purportedly for the first time if there is an existing token commitment representing, on the ZKP-enabled DLN 100, the combined asset identified by the combined asset token $A_i$.

In some embodiments, if a token commitment representing an asset (e.g., a combined asset identified by a combined asset token B) already exists on the ZKP-enabled DLN 100, then a new token commitment Z' representing the same combined asset can be generated on the ZKP-enabled DLN 100 only upon the nullification or invalidation of the existing token commitment Z, as discussed below (by nullified or invalidated, in some embodiments, it is meant, without limitations, that the existing token commitment is no longer valid to represent the asset on the ZKP-enabled DLN 100 (e.g., the smart contract would reject the token commitment if it were provided to it as a representation of the asset)). In other words, no two token commitments, each including the same asset token that identifies the same asset, can represent the asset on the ZKP-enabled DLN 100 at the same time.

As a specific example, if the constituent combined 114 is a vehicle and the vehicle has already been represented on the ZKP-enabled DLN 100, e.g., an asset token $B_V$ has been generated (e.g., by combining the constituent asset tokens of the vehicle frame 116 and the vehicle engine 112) and a token commitment $Z_V=H(S_V||P_k||B_V)$ has been added onto a commitments data structure of the ZKP-enabled DLN 100 (to signify the minting or registration of the vehicle on the ZKP-enabled DLN 100), then the smart contract may use $H(B_V)$ to make sure that no other token commitment purporting to include $B_V$ and represent the vehicle may be added onto the commitments data structure. For example, the smart contract may inspect a double-spend preventer data structure on the ZKP-enabled DLN 100 for the presence of $H(B_V)$, and if the hash is present (which corresponds to the token commitment $Z_V$ being on the commitments data structure), then the smart contract may not allow any other token commitment that includes $B_V$ to be added onto the commitments data structure as that would represent a prohibited double minting of an asset. In some instances, the new token commitment can be added onto the commitments data structure if the existing token commitment $Z_V$ is nullified, as discussed below (e.g., corresponding to the transfer of the vehicle asset from one participant of the ZKP-enabled DLN 100 to another).

In some embodiments, the sender 110*a*, using the computing node 102*a*, provides the ZKP (e.g., the ZKP that the combined asset token commitment Z includes the combined asset token B, the ZKP that H(B) includes the combined asset token B, etc.) to the smart contract without having revealed B to the ZKP-enabled DLN 100 (e.g., without exposing B to the participants of the blockchain network), thereby protecting the identity of the physical combined asset 114. The hashing of the combined asset token B also allows the sender 110*a* to hide the identity of the combined asset token B (and hence the combined asset 114 identified by the asset token B) from the ZKP-enabled DLN 100 or the smart contract (and hence from the other participants on the ZKP-enabled DLN 100).

Upon receiving the combined asset token commitment Z, the hash of the asset token B, H(B), and/or the ZKPs, in some embodiments, the self-executing code or smart contract may verify the ZKPs. For example, the smart contract may obtain or retrieve a public input and/or a verification key (e.g., from the sender 110*a*) and compute the ZKPs to verify statements included in the ZKPs, such as the statement that H(B) includes B (i.e., the statement that H(B) is obtained by applying a hashing function or algorithm on the combined asset token B) and/or the statement that the combined asset token commitment Z also includes B (i.e., the statement that Z is obtained by applying a hashing function or algorithm on the combined asset token B). Further, the smart contract may verify that there has never been an H(B) provided to the smart contract previously (e.g., if the combined asset 114 has never been represented on the ZKP-enabled DLN 100).

For example, at 210, the ZKP-enabled DLN 100 may include a double-spend preventer data structure that includes all the hashes of asset tokens that have been provided to the smart contract previously. In such embodiments, the smart contract may check the double-spend preventer data structure for the presence of a hash of the combined asset token B, and if there is an H(B) in the double-spend preventer data structure, this may be understood as the combined asset 114 identified off-chain by the combined asset token B has already been minted or registered on the ZKP-enabled DLN 100, and as such, the smart contract may reject the combined asset token commitment Z provided by the sender 110*a*, and prevent its inclusion or addition onto a commitments data structure on the ZKP-enabled DLN 100.

In some embodiments, the commitments data structure includes token commitments that are added into the commitments data structure after the smart contract verifies that the double-spend preventer data structure does not contain the hashes of the asset tokens included in the token commitments (e.g., after the smart contract verifies that H(B) is not included in the double-spend preventer data structure). As such, the double-spend preventer data structure can be used to prevent the undesirable problem of "double minting" or "double spend," where a user of the ZKP-enabled DLN 100 may mint or generate two (or in general, multiple) combined asset token commitments $Z_n=H(S_n||P_k||B)$ for a single combined asset identified by B, and attempt to transfer the two (or multiple) combined asset token commitments ($Z_n$) to different entities (which is what a "double spend" is, since there is only a single underlying asset for the multiple transfers). Once there is a H(B) in the double-spend preventer data structure, in some implementations, the smart contract would not allow adding, into the commitments data structure, a new token commitment representing the asset identified by the same constituent asset token B. That is, the smart contract would not allow the registration of a new combined asset token commitment $Z=H(S||P_k||B)$ on the ZKP-enabled DLN 100 for a combined asset 114 identified by the combined asset token B if H(B) is present in the double-spend preventer data structure. In some embodiments, the double-spend preventer data structure and/or the commitments data structure may be stored on the ZKP-enabled DLN 100 (e.g., these data structures may be stored on storage systems that are linked to or part of the computing nodes 102*a*-102*e* that make up the ZKP-enabled DLN 100).

In some embodiments, the smart contract may discover that the hash of the combined asset token B, H(B), is not in the double-spend preventer data structure. In such embodiments, the smart contract may add H(B) into double-spend preventer data structure and allow the addition of the respective combined asset token commitment Z into the commitments data structure on the ZKP-enabled DLN 100. The addition of the combined asset token commitment Z into the commitments data structure, at 212, may signify the representation or registration of the combined asset 114 identified by the combined asset token B, on the ZKP-enabled DLN 100. Further, since the token commitment Z includes an identifier (e.g., a public identifier) of the sender 110*a* on the ZKP-enabled DLN 100 (e.g., public key of the sender 110*a*), in some implementations, the token commitment Z can also serve as a notice or a record of the ownership of the combined asset (e.g., ownership belonging to the entity that is behind the public key on the ZKP-enabled DLN 100, i.e., the sender 110*a*). It is to be noted, however, that, in some embodiments, other participants on the ZKP-enabled DLN 100 may not be privy to the combined asset token B and/or the combined asset 114 (e.g., the other participants may not be privy to the identity of the combined asset) and/or the owner/sender 110*a* of the combined asset. That is, accordingly, the privacy of the sender 110*a* (as it relates to ownership and identity of the asset0, for example) can be protected as a result of the use of ZKP in the methods and systems disclosed herein.

Figure 3:
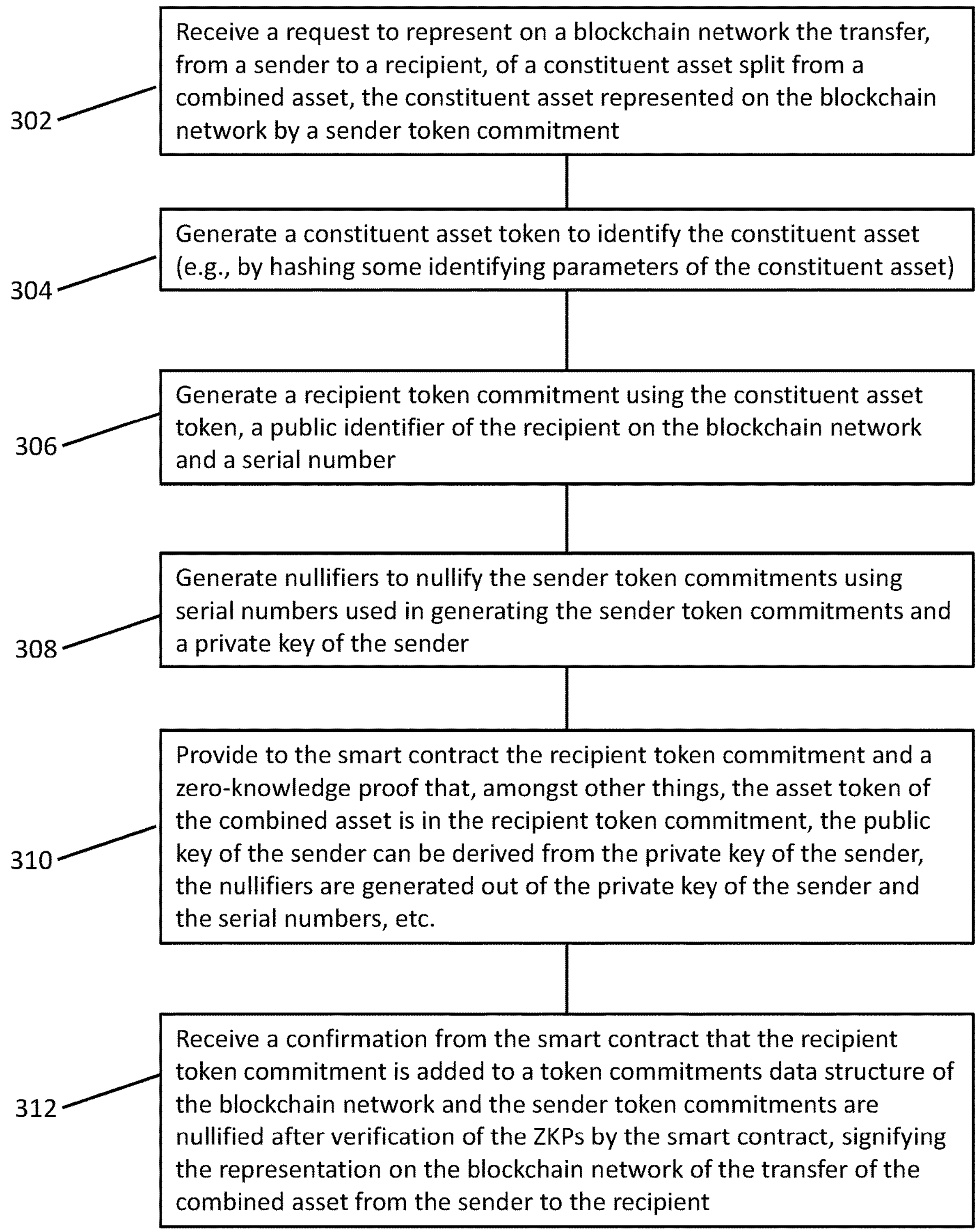
FIG. 3 shows a flow chart illustrating the creation or generation of new token commitments on the distributed ledger-based network to represent the transfer from a sender to a recipient of a constituent asset that is split off a combined or composite asset, according to some embodiment.

FIG. 3 shows a flow chart illustrating the generation of a new token commitment on the ZKP-enabled DLN 100 to represent the transfer, from a sender to a recipient, of a real-world or physical constituent asset that is split off a combined or composite asset, according to some embodiments. In some embodiments, the asset to be transferred may be a part or component of an asset (e.g., a constituent asset 112, 116 of the combined asset 114), and at 302, a request may be received for the constituent asset to be transferred from the sender 110*a* to the recipient 110*b* (and for the transfer to be represented on the ZKP-enabled DLN 100, for example). For example, the recipient 110*b* may send a request or an order to purchase a part or component of a damaged vehicle (e.g., the engine only), and the owner 110*a* of the damaged vehicle may take out the engine for shipping to the recipient 110*b*. In other words, with reference to FIG. 1, the owner (e.g., sender 110*a*) of the combined asset 114 may split or partition the combined asset 114 into constituent assets 112, 116 and transfer one or more of the constituent assets 112, 116 to a recipient 110*b*.

In some implementations, the constituent assets 112, 116 may be shipped to different recipients 110*b*, 110*c*. In such implementations, at 304 and as discussed above, the sender 110*a* may generate, using the computing node 102*a* and for the constituent asset 112 to be transferred to the recipient 110*b*, a unique asset identifier by cryptographically hashing (e.g., using the SHA-256 algorithm) the identifying parameters of the constituent asset 112 to generate an asset token A that can serve as the unique asset identifier. For example, if the request is for the shipment of the engine (constituent asset 112), the sender 110*a* may generate, as discussed above in detail, a constituent asset token A for the constituent asset 112 by cryptographically hashing the identifying parameters of the constituent asset 112 (e.g., the asset token for the engine 112 may be generated by cryptographically hashing, amongst other things, the engine number of the engine 112). In some embodiments, the constituent asset token A may be generated and stored off-chain, i.e., off of the ZKP-enabled DLN 100. For example, the token may be generated and stored in storage systems or databases that are linked with the ZKP-enabled DLN 100. For instance, if the ZKP-enabled DLN 100 is a ZKP-enabled Ethereum blockchain network, the tokens may be generated and stored in the Swarm database.

It is to be noted that the discussions in the current disclosure related to the transfer of one of the constituent assets 112 equally apply to the rest of the constituent assets 116. For example, the sender 110*a* may transfer all of the constituent assets 112, 116 to the recipient 110*b*, or transfer one or more of the constituent assets 112, 116 to different recipients (e.g., 110*b* and 110*c*). For instance, the owner may transfer constituent asset 112 to the recipient 110*b* while keeping the rest of the constituent assets 116 or transferring these constituent assets 116 to other recipients of the of the ZKP-enabled DLN 100 (or even the recipient 110*b*).

In some embodiments, the sender 110*a* may not transfer the constituent assets 112, 116 to other participants of the ZKP-enabled DLN 100, but rather keep the constituent assets 112, 116 to him/herself (in other words, “transfer” the constituent assets 112, 116 back to themselves). For example, the sender 110*a* may use the ZKP-enabled DLN 100 as an inventory management system. For instance, referring to the example presented above, the sender 110*a* may be a retailer that receives wholesale or bulk items and needs to partition the bulk items into multiple unit items that can then be put on sale for customers. In such cases, the sender 110*a* may use the ZKP-enabled DLN 100, according to the discussions presented herein for transferring constituent assets, to partition the bulk items (“combined assets”) into the multiple unit items (“constituent assets”), without necessarily transferring the unit items to anyone else at least for some duration.

As discussed previously, the transfer of an asset from a sender to a recipient may generally be represented on the ZKP-enabled DLN 100 by the generation of a new recipient token commitment that assigns ownership of the asset to the recipient, and the nullification of the existing token commitment that assigned ownership of the asset to the sender. In embodiments where the asset being transferred is separated or split off from a combined asset, such as the transfer of the constituent asset 112 from the sender 110*a* to the recipient 110*b*, a recipient token commitment Z' that includes the constituent asset token A (e.g., the constituent asset token A for the constituent asset 112) and assigns ownership of the constituent asset 112 to the recipient 110*b* may be generated and registered on the ZKP-enabled DLN 100 (e.g., added to a commitments data structure on the ZKP-enabled DLN 100) to represent the constituent asset 112 on the ZKP-enabled DLN 100. Further, in some embodiments, the combined asset token commitment Z (e.g., the combined asset commitment Z representing the combined asset 114 on the ZKP-enabled DLN 100 and including the combined asset token $B=A_1\| \ldots \|A_n$, where $A_i$ is the constituent asset token identifying the $i^{th}$ constituent assets 112, 116) may have to be nullified or invalidated on the ZKP-enabled DLN 100 to avoid double-spend (e.g., otherwise, the sender 110*a* can generate a new token commitment Z" assigning ownership of the asset 112 to a new recipient 110*c* (and transfer Z" to the a new recipient 110*c*), even though the recipient token commitment Z' has already been transferred to recipient 110*b*). In some implementations, the sender 110*a* would be able to accomplish this because the sender 110*a* can have a smart contract in the ZKP-enabled DLN 100 execute such that the sender 110*a* appears to own the combined asset 114 (if the combined asset token commitment Z is not nullified).

In some embodiments, at 306, to represent the constituent asset 112 identified by the asset token A, the recipient token commitment Z' can be generated by an application of a hashing function or algorithm on the constituent asset token A. Further, the hashing function or algorithm can be applied to an identifier (e.g., public identifier) of the recipient 110*b* to encode the new ownership of the constituent asset 112 (to the recipient 110*b*) in the recipient token commitment Z'. An example of such identifier includes the public key of the recipient 110*b* on the ZKP-enabled DLN 100. In addition, in some implementations, the hashing function may also be applied on a serial number for reasons discussed above (e.g., as a handle on the recipient token commitment Z'; for example, for use in generating nullifiers as discussed below). In some implementations, the serial number used to generate the combined asset token commitment Z may be different from the serial number that would be used to generate the recipient token commitment Z'.

An example implementation of the generation of a non-fungible recipient token commitment to represent the constituent asset 112 as discussed above can include the computation of a recipient token commitment (Z'-token) as follows: $Z'=H(S'\|P_k'\|A)$, where A is the constituent asset token identifying the constituent asset 112 (and which is one of the constituent asset tokens $A_i$ used in generating the combined asset token $B=A_1\|A_2\| \ldots A_n$), $P_k'$ is the public key on the ZKP-enabled DLN 100 that is associated with the recipient 110*b*, S' is a serial number, H is a cryptographic hashing function or algorithm (e.g., SHA-256), || represents a concatenation operator and B is the combined asset token. In some embodiments, S' may be different from S (the serial number used in generating the combined asset token commitment Z). In some embodiments, the computation of the recipient token commitment Z' may include application of the hashing function on additional elements besides or instead of S', $P_k'$ and A. In some embodiments, the recipient token commitment Z' may comprise or consist S', $P_k$ and A. In some embodiments, the recipient token commitment Z' may be generated by the sender 110*a* and provided, via the computing node 102*a*, to the smart contract of the ZKP-enabled DLN 100 anonymously. Further, the sender 110*a* may secretly provide the recipient 110*b* the serial number S', the combined asset token B, and/or the constituent asset token $A_i$ (e.g., without divulging or revealing S', B and/or $A_i$ to the ZKP-enabled DLN 100 (e.g., to the public or the other participants of the ZKP-enabled DLN 100)).

In some embodiments, the sender 110*a* may provide (e.g., anonymously) to the smart contract the recipient token commitment Z' and/or the hash of the constituent asset token A, H(A), for addition into the commitments data structure and the double-spend preventer data structure, respectively, of the ZKP-enabled DLN 100. In some implementations, the hashing of the constituent asset token A allows the sender 110*a* to hide the identity of the constituent asset token A (and consequently, the constituent asset 112 identified by the constituent asset token A) from the other participants of the ZKP-enabled DLN 100, such as participant 110*c* , thereby enhancing the privacy and security of the transaction involving the transfer of the constituent asset 112 between the sender 110*a* and the recipient 110*b*. In some embodiments, the hash of the constituent asset token A, H(A), may already be stored in the double-spend preventer data structure. In such embodiments, the smart contract may not prevent the addition of the recipient token commitment Z' into the commitments data structure solely on account of the presence of H(A) in the double-spend preventer data structure, because the constituent asset 112 identified by the constituent asset token A may have previously been used to form a combined asset (such as the combined asset identified by the combined asset token B).

Before the smart contract can allow the addition of the recipient token commitment Z' and/or the hash of the constituent asset token A, H(A), onto the commitments data structure and/or the double-spend preventer data structure, respectively, thereby representing the passing of the ownership of the constituent asset 112 on the ZKP-enabled DLN 100 from the sender 110*a* to the recipient 110*b*, in some embodiments, the sender 110*a* may have to demonstrate to the smart contract the fulfillment of several conditions. For example, the sender 110*a* would have to demonstrate, amongst other things, that the combined asset token commitment Z belongs to the sender 110*a* (signifying that the combined asset 114 belongs to the sender 110*a* and as such the constituent asset 112, obtained from the combined asset 114 belongs to the sender 110*a*). Further, the sender 110*a* would have to demonstrate to the smart contract that the recipient asset token commitment Z', representing the same constituent asset 112 but assigning ownership to the recipient 110*b*, has been generated and that the constituent asset token commitments Z has been nullified or invalidated. These various demonstrations are described below.

In some embodiments, to demonstrate to the smart contract that the combined asset token commitment Z belongs to the sender 110*a* (which indicates the sender's 110*a* ownership of the combined asset 114 from which the constituent asset 112 that is being transferred from sender 110*a* to recipient 110*b* is obtained), the sender 110*a* can provide the smart contract anonymously a ZKP that the sender 110*a* knows that the combined asset token commitment Z is obtained by an application of a hashing function on a combination of a serial number, an asset identifier of the asset represented on the ZKP-enabled DLN 100 by Z (e.g., an asset identifier such as the combined asset token B) and/or an identifier associated with the sender 110*a* on the ZKP-enabled DLN 100 such as but not limited to a public identifier (e.g., public key). For example, the ZKP can include a proof that the sender 110*a* has knowledge that Z is obtained by applying a hashing function or algorithm on a combination of a serial number S, an asset token B that can be used as an identifier of the combined asset 114, and/or the public key of the sender 110*a* on the ZKP-enabled DLN 100. As a specific example, the ZKP can include a proof that Z is obtained by the computation $H(S\|P_k\|B)$.

In some embodiments, providing a proof that the sender 110*a* knows that the combined asset token commitment Z is obtained by an application of a hashing function on a combination of a serial number, an asset identifier of the combined asset and/or an identifier associated with the sender 110*a* on the ZKP-enabled DLN 100 may not be sufficient as a proof that the combined asset token commitment Z belongs to the sender 110*a*, since there could be other participants of the ZKP-enabled DLN 100 that can have the stated information. For example, in some embodiments, the combined asset 114 may not have been minted or represented on the ZKP-enabled DLN 100 initially by the sender 110*a*, but rather by a prior owner or sender (not shown) that then transferred the combined asset 114 to the sender 110*a*. In such cases, the prior sender may have been the one that generated the combined asset token B (off-chain, for example) and represented the transfer of the combined asset 114 from the prior sender to the sender 110*a* on the ZKP-enabled DLN 100 by having the smart contract on the ZKP-enabled DLN 100 add the token commitment $Z=H(S\|P_k\|B)$ to the token commitments data structure, where $P_k$ is the public key of the sender 110*a* that is receiving the combined asset 114 from the prior owner. In such embodiments, the prior owner would have knowledge or possession of S, $P_k$ and/or B, and as such can generate similar or same ZKP as the one generated by the sender 110*a* and provided to the smart contract to represent the transfer of the combined asset 114 to the recipient 110*b*.

As such, to demonstrate to the smart contract that the sender 110*a* is the rightful (e.g., current) owner of the combined asset 114, in some implementations, the sender 110*a* may also provide to the smart contract, via the computing node 102*a*, a ZKP that the sender 110*a* can generate the public identifier associated with the sender 110*a* on the ZKP-enabled DLN 100 from a corresponding secret identifier associated with the sender 110*a* on the ZKP-enabled DLN 100. For example, the public identifier associated with the sender 110*a* can be the public key of the sender 110*a*, and the sender 110*a* can provide the smart contract a ZKP that the sender 110*a* can derive or obtain the public key $P_k$ from the private key $V_k$ of the sender 110*a*. For example, the ZKP may include the proof that the public key $P_k$ can be obtained or derived by a cryptographic hashing of the private key, such as but not limited to, $P_k=H(V_k)$. As the private key $V_k$ is known only to the sender 110*a*, at least nominally, in such implementations, the prior sender or any other party or participant of the ZKP-enabled DLN 100 may not be able to generate such ZKP. As such, in some embodiments, the sender's claim that the combined asset token commitments Z belongs to the sender 110*a* may be proved by verifying the ZKP, generated and provided to the smart contract by the sender 110*a*, that the sender 110*a* has knowledge that Z can be obtained by computing $H(S\|P_k\|B)$ and that $P_k$ can be obtained from $V_k$ (e.g., $P_k=H(V_k)$).

In some embodiments, the sender 110*a* may also have to demonstrate to the smart contract that the combined asset token commitment Z is no longer valid before the smart contract can allow the addition of the recipient token commitment Z' onto the commitments data structure. The smart contract may enforce this condition to avoid a "double-spend" by the sender 110*a*, where the sender 110*a* can generate and send to other participants 110*c*-110*e* new recipient token commitment Znew' that represents the same combined asset 114 represented by the combined asset token commitment Z (the term "double spend" refers to the fact that the sender 110*a* would be transferring different recipient token commitments Z' and Znew' to different participants 110*c*-110*e* , even though the recipient token commitments Z' and Znew' represent the same underlying combined asset 114). In some embodiments, "double spend" by the sender 110*a* can be prevented by having the sender 110*a* generate and provide to the smart contract, via the computing node 102*a*, a nullifier that nullifies the combined asset token commitment Z that is already on the token commitments data structure. By requiring the sender 110*a* to nullify an existing valid token commitment Z (e.g., a token commitment that is stored in the token commitments data structure) prior to the addition of a new recipient token commitment Z' into the token commitments data structure, in some implementations, the smart contract prevents the "double spend" problem, since the sender 110*a* can nullify the combined asset token commitment Z only once (hence only one Z' can be added into the commitments data structure, i.e., no "double spend").

In some embodiments, at 308, the nullifier of the combined asset token commitment Z can be constructed or generated out of the serial number S that was used to generate the combined asset token commitment Z. The serial number S, however, may be known to other participants of the ZKP-enabled DLN 100 (i.e., besides the sender 110*a*), such as a previous owner of the combined asset 114 currently represented on the ZKP-enabled DLN 100 by Z. To demonstrate to the smart contract that the nullifier is in fact constructed or generated by the sender 110*a* (who currently owns the combined asset token commitment $Z_i$, and not by a previous owner that may know what S is, for example), in some embodiments, the sender 110*a* may include in the nullifier a secret element or identifier that is known only to the sender 110*a* (or at least, a secret element or identifier that is not known to the rest of the ZKP-enabled DLN 100 participants 110*c*-110*e*). For example, in some embodiments, the nullifier can be computed via an application of a hashing function H on the serial number S and the private key of the sender 110*a*, $V_k$, as follows: $N_i=H(S_i\|V_k)$.

At 310, the sender 110*a* may provide (e.g., anonymously) the nullifier N to the smart contract, via the computing node 102*a*, along with a ZKP that the sender 110*a* knows N is obtained via an application of the hashing function H on the serial number S and the private key $V_k$. In some implementations, the hashing allows the sender 110*a* to hide the identity of the serial number S and/or the private key $V_k$, and the ZKP allows the sender 110*a* to convince the smart contract, if the proof is verified, that N includes S and $V_k$, without the sender 110*a* having to reveal S and $V_k$ themselves to the smart contract or the participants of the ZKP-enabled DLN 100. In some embodiments, the ZKP-enabled DLN 100 may include a nullifier data structure that includes all the nullifiers that have been provided to the smart contract. For example, the nullifier data structure may be stored on the ZKP-enabled DLN 100 (e.g., the data structure may be stored on storage systems that are linked to or part of the computing nodes 102*a*-102*e* that make up the ZKP-enabled DLN 100). In such embodiments, the smart contract may check to see if the nullifier N provided by the sender 110*a* is already present in the nullifier data structure, and if so, may reject the addition of the recipient token commitment Z' onto the commitments data structure as the presence of N in the nullifier data structure indicates that the combined asset token commitment Z has already been nullified (which indicates that the sender 110*a* does not own the underlying combined asset 114 represented on the ZKP-enabled DLN 100 by Z, and as such cannot be in the position to transfer the constituent asset 112, which was obtained from the combined asset 114, to the recipient 110*b*).

Before the smart contract can allow the addition of the recipient token commitment Z' onto the commitments data structure, in some embodiments, the sender 110*a* may also have to demonstrate to the smart contract that the recipient token commitment Z' includes an identifier associated with the recipient (e.g., a public identifier such as the public key $P_k'$ of the recipient), an identifier that can be used to identify the asset being transferred to the recipient 110*b* (e.g., the constituent asset token A) and/or the serial number S'. To accomplish this goal without revealing identifying information about the public key $P_k'$, the constituent asset token A and/or the serial number S' on the ZKP-enabled DLN 100, at 310, the sender 110*a* may generate and provide to the smart contract, via the computing node 102*a*, a ZKP that Z' includes, or is generated using, the identifier associated with the recipient (e.g., the public key $P_k'$ of the recipient), the asset identifier (e.g., the constituent asset token A) and/or the serial number S'. Further, the sender 110*a* may have to demonstrate to the smart contract that the constituent asset token A is one of the constituent asset tokens that are combined to generate the combined asset token B. For example, the sender 110*a* may have to demonstrate to the smart contract that $B=A_1\|A_2\| \ldots A_n$, where the constituent asset token A is one of the set of constituent asset tokens $A_1 \ldots A_n$. That is, the sender 110*a* may generate and provide to the smart contract (e.g., anonymously), via the computing node 102*a*, a ZKP that the combined asset token B that identifies the combined asset 114 on the ZKP-enabled DLN 100 is obtained by combining the constituent asset tokens $A_i$ that identify the constituent assets 112, 116 that are combined to produce or form the combined asset 114 (e.g., the ZKP may be a proof that $B=A_1\|A_2\| \ldots A_n$). In addition, the sender 110*a* may have to demonstrate to the smart contract that H(A), which the sender 110 provided to the smart contract to be added into the double-spend preventer data structure, in fact contains the constituent asset token A (the smart contract wouldn't know, based on just H(A), that A is included in H(A) as the hashing of the constituent asset token A hides the identity of the constituent asset token A). In such embodiments, the sender 110*a* may generate and provide to the smart contract (e.g., anonymously), via the computing node 102*a*, a ZKP that H(A) includes the constituent asset token A.

Upon receiving the above-identified ZKPs, in some embodiments, the smart contract may verify the ZKPs and/or check that the nullifiers N is already included in the nullifier data structure of the ZKP-enabled DLN 100. As N is configured to nullify the combined asset token commitment Z upon addition onto the nullifier data structure, in some implementations, its prior presence on the nullifier data structure would indicate that Z has already been nullified, which would cause the smart contract to reject the addition of the recipient token commitment Z' onto the commitments data structure. In some embodiments, upon verifying that the nullifier N is not included in the nullifier data structure, the smart contract may add the nullifiers into the nullifier data structure (after all the ZKPs are verified, for example).

As discussed above, the ZKPs provided by the sender 110*a* include (a) the ZKP that the nullifier N is obtained via an application of a hashing function or algorithm on a serial number and/or a private key on the ZKP-enabled DLN 100 of the sender 110*a*, (b) the ZKP that the combined asset token commitment Z is obtained via an application of a hashing function on the same serial number S used in generating the nullifier N, a public identifier on the ZKP-enabled DLN 100 of the sender 110*a* (e.g., the public key of the sender 110*a*) and/or the combined asset token B, (c) the ZKP that the sender 110*a* can generate or derive the public identifier associated with the sender 110*a* from a secret identifier associated with the sender 110*a* (e.g., the sender 110*a* can derive its public key from its private key), (d) the ZKP that the recipient token commitment Z' is obtained via an application of a hashing function on a serial number (e.g., different from the serial number used to generate Z), a public identifier on the ZKP-enabled DLN 100 of the recipient 110*b* (e.g., the public key of the recipient 110*b*) and/or the constituent asset token A, (e) the ZKP that H(A) includes A, e.g., H(A) is obtained via an application of a hashing function on the constituent asset token A, and/or (f) the ZKP that the combined asset token B is obtained by combining the constituent asset tokens $A_i$. After verifying one or more of the above-identified ZKPs, at 312, the smart contract may allow the recipient token commitment Z' to be added onto the commitments data structure of the ZKP-enabled DLN 100, which signifies the representation, on the ZKP-enabled DLN 100, of the transfer of the constituent asset 112 from the sender 110*a* to the recipient 110*b*.

In some embodiments, if the recipient 110*b* wishes to transfer the constituent asset 112 to another participant 110*c* after receiving it from the sender 110*a*, the recipient 110*b* may do so by generating a new token commitment Z" using, amongst other things, the public identifier (e.g., public key) of the new recipient 110*c* and nullifying the existing token commitment Z'. The recipient 110*b* may not, however, be able to generate a new asset token to identify the asset 112, as the presence of the hash of the asset token A, H(A), in the preventer data structure would cause the smart contract to reject the token commitment Z" the recipient 110*b* would have to provide to the smart contract to represent the transfer of the asset to the new recipient 110*c*.

As discussed above, with the use of ZKPs, a sender 110*a* can represent on the ZKP-enabled DLN 100 a physical, off-chain constituent asset 112 (e.g., non-fungible asset), without having to disclose or reveal to other participants of the ZKP-enabled DLN 100 (or to the public) any identifying information about the constituent asset 112 or the combined asset 114 from which it came or was split off (e.g., without revealing the asset tokens A obtained by hashing identifying parameters of the constituent asset 112, 116 such as serial numbers, model numbers, asset name, etc., or the combined asset token B obtained by combining the constituent asset tokens A). Further, the identity of the sender 110*a* as well as the identity of the recipient 110*b* can also remain hidden from the other participants of the ZKP-enabled DLN 100, since, for example, the sender 110*a* interacts with the smart contract anonymously, and the token commitments that include public identifiers such as $Z=H(S\|P_k\|B)$ and $Z'=H(S'\|P_k'\|A)$ are hashed, concealing or cloaking the identities of the sender 110*a* and/or the recipient 110*b*. The smart contract can verify the provided ZKPs, and allow the recipient token commitment Z' to be added onto the token commitments data structure, without having access to information that reveals the identities of the assets and/or the transaction participants.

For example, as noted above, the sender 110*a* provides to the smart contract anonymously (and hence hidden from at least the other participants 110*c*-110*e*) the combined token commitment $Z=H(S\|P_k\|B)$, the recipient token commitment $Z'=H(S'\|P_k'\|A)$ and the nullifier $N=H(S\|S_k)$, without revealing S, $P_k$, S', $P_k'$, A, B and/or $S_k$, thereby protecting the identities of the sender 110*a*, the recipient 110*b* and/or the assets identified by the tokens A and/or B. In some implementations, the identity of the sender 110*a* can be protected as the sender 110*a* communicates with the smart contract anonymously. The smart contract can, without having access to any of these information, verify the provided ZKPs and allow (i) the addition of the recipient token commitment Z' onto the token commitments data structure and/or (ii) the nullification of the combined asset token commitment Z (e.g., invalidating the combined asset token commitment Z stored in the commitments data structure of ZKP-enabled DLN 100). As such, the use of ZKPs in the ZKP-enabled DLN 100 allows for the representation of a transaction including the transfer of the asset 112 on the ZKP-enabled DLN 100 while preserving the confidentiality or privacy of the participants of the transaction (such as sender 110*a* and recipient 110*b*) as well as the assets (such as the combined asset 114 and its constituent assets 112, 116) and the transaction itself (e.g., serial numbers, asset tokens, etc. generated during the transaction).

In some embodiments, a method includes receiving a request that is configured to trigger a transfer of a first asset from a sender to a recipient. The first asset is part of a combined asset that includes the first asset and a second asset. A token commitment representing the first asset and not a second asset is stored in a distributed ledger-based network (DLN). The method also includes causing, in response to the request and on the DLN, a registration of a transfer of the first asset from the sender to the recipient. The registration of the transfer occurs after verification of a zero-knowledge proof (ZKP), provided by a provider, that the provider has knowledge of an identity of an asset token of the first asset. The token commitment is obtained via an application of a hashing function on the asset token of the first asset. A combined asset token of the combined asset consists of the first asset token and the second asset token.

In some embodiments, the hashing function is a first hashing function, the token commitment is a first token commitment, and a second token commitment represents the combined asset on the DLN, the second token commitment obtained via an application of a second hashing function on a combined asset token of the combined asset. The ZKP can include the ZKP that the prover has knowledge of an identity of: (a) a first identifier associated with the recipient, the first token commitment obtained via the application of the first hashing function on the first identifier, the first identifier including a public key of the sender on the DLN; and/or (b) a second identifier associated with the sender, the second token commitment obtained via the application of the second hashing function on the second identifier, the second identifier including a public key of the sender on the DLN.

In some embodiments, the hashing function is a first hashing function, the token commitment is a first token commitment, and a second token commitment represents the combined asset on the DLN. The ZKP can include the ZKP that the provider has knowledge of an identity of a nullifier obtained via an application of a second hashing function on a serial number and/or a secret identifier associated with the sender. A presence of the nullifier in a nullifier data structure on the DLN can indicate invalidity of the second token commitment, and the secret identifier can include the private key of the sender.

In some embodiments, the hashing function is a first hashing function, the token commitment is a first token commitment, and a second token commitment represents the combined asset on the DLN. The second token commitment represents the combined asset on the DLN, and is obtained via an application of a second hashing function on a serial number and/or a combined asset hash value of the combined asset. The ZKP includes the ZKP that the provider has knowledge of an identity of a nullifier obtained via an application of a third hashing function on the serial number and/or a secret identifier associated with the sender. A presence of the nullifier in a nullifier data structure on the DLN can indicate invalidity of the second token commitment.

In some embodiments, the ZKP includes the ZKP that the prover is capable of deriving a public identifier associated with the sender from a secret identifier associated with the sender. The public identifier and the secret identifier can include a public key and a private key, respectively, of the sender on the DLN. The registration of the transfer can occur without revealing any identifying information of the first asset, the second asset, the combined asset, and/or the token commitment. The application of the hashing function can include the application of the hashing function on an identifier associated with the recipient. The identifier can include a public key on the DLN of the recipient.

In some embodiments, a method includes receiving a request that is configured to cause a splitting of a combined asset into a first asset and a second asset respectively represented on a distributed ledger-based network (DLN) by a first token commitment and a second token commitment. The method also include providing, from a provider and to a self-executing code segment on the DLN, a zero-knowledge proof (ZKP) that the provider has knowledge of an identity of: (1) a first asset token of the first asset, the first token commitment obtained via an application of a first hashing function on the first asset token; (2) a second asset token of the second asset, the second token commitment obtained via an application of a second hashing function on the second asset token; and/or (3) a combined asset token of the combined asset, the combined asset token including the first asset token and the second asset token, a third token commitment representing the combined asset on the DLN obtained via an application of a third hashing function on the combined asset token. The method also includes receiving, upon verification of the ZKP by the self-executing code segment, a confirmation confirming an addition of the first token commitment and the second token commitment onto a commitments data structure of the DLN.

In some embodiments, the combined asset token consists of the first asset token and the second asset token, and the ZKP includes the ZKP that the provider has knowledge of the combined asset token consisting the first asset token and the second asset token. Receiving the confirmation can occur without revealing any identifying information of an owner of the first asset, the second asset and/or the combined asset, the identifying information of the owner including a public key of the owner and/or a private key of the owner on the DLN.

In some embodiments, a method includes receiving a request that is configured to cause a transfer of a first asset from a sender to a recipient The first asset is part of a combined asset that includes the first asset and a second asset. The method also includes obtaining, upon receiving the request, a first asset token of the first asset. A combined asset token of the combined asset includes a combination of the first asset token and a second asset token of the second asset. The method also includes generating, on a distributed ledger-based network (DLN), a token commitment representing the first asset and not the second asset via an application of a hashing function on the first asset token of the first asset. The method also includes providing, from a provider and to a self-executing code segment on the DLN, a zero-knowledge proof (ZKP) that the provider has knowledge of an identity of the first asset token of the first asset. The method also includes receiving, after verification of the ZKP by the self-executing code segment, a confirmation confirming an addition of the token commitment onto a commitments data structure of the DLN. Receiving the confirmation can occur without revealing any identifying information of the sender and/or the recipient, the identifying information of the sender and/or the recipient including a public key of the sender, a private key of the sender, a public key of the recipient and/or a private key of the recipient, on the DLN. In some such embodiments, the hashing function is a first hashing function, and the first asset token is obtained via an application of a second hashing function on an identifying parameter of the first asset, with the application of the second hashing function occurring off-the-DLN.

In other such embodiments, the token commitment is a first token commitment, a second token commitment represents the combined asset on the DLN, and the first token commitment is added onto the commitments data structure after the self-executing code segment adds a nullifier into a nullifier data structure on the DLN after verifying that the nullifier is not stored in the nullifier data structure prior to the addition of the first token commitment onto the commitments data structure. A presence of the nullifier in the nullifier data structure can indicate invalidity of the second token commitment.

In still other such embodiments, the hashing function is a first hashing function, the token commitment is a first token commitment, and a second token commitment represents the combined asset on the DLN. The ZKP includes the ZKP that the provider has knowledge of an identity of a nullifier obtained via an application of a second hashing function on a serial number and/or a secret identifier associated with the sender. A presence of the nullifier in a nullifier data structure on the DLN can indicate invalidity of the second token commitment. The secret identifier includes the private key of the sender.

In still other such embodiments, the hashing function is a first hashing function, the token commitment is a first token commitment, and a second token commitment represents the combined asset on the DLN. The second token commitment is obtained via an application of a second hashing function on a serial number and/or the combined asset token of the combined asset. The ZKP includes the ZKP that the provider has knowledge of an identity of a nullifier obtained via an application of a third hashing function on the serial number and/or a secret identifier associated with the sender. A presence of the nullifier in a nullifier data structure on the DLN can indicate invalidity of the second token commitment.

In still other such embodiments, the hashing function is a first hashing function, the token commitment is a first token commitment, and a second token commitment represents the combined asset on the DLN. The second token commitment is obtained via an application of a second hashing function on the combined asset token of the combined asset and/or an identifier associated with the sender. The identifier includes a public key on the DLN of the sender.

In still other such embodiments, the hashing function is a first hashing function, the token commitment is a first token commitment, and a second token commitment represents the combined asset on the DLN. The second token commitment is obtained via an application of a second hashing function on the combined asset token of the combined asset. The ZKP includes the ZKP that the provider has knowledge of an identity of: (a) a first identifier associated with the recipient, the first token commitment obtained via the application of the first hashing function on the first identifier, and/or (b) a second identifier associated with the sender, the second token commitment obtained via the application of the second hashing function on the second identifier.

In still other such embodiments, the hashing function is a first hashing function, the token commitment is a first token commitment, and a second token commitment represents the combined asset on the DLN. The second token commitment is obtained via an application of a second hashing function on the combined asset token of the combined asset. The ZKP includes the ZKP that the provider has knowledge of an identity of: (a) a first identifier associated with the recipient, the first token commitment obtained via the application of the first hashing function on the first identifier, the first identifier including a public key of the recipient on the DLN; and/or (b) a second identifier associated with the sender, the second token commitment obtained via the application of the first hashing function on the second identifier, the second identifier including a public key of the sender on the DLN. In still other such embodiments, the ZKP can include the ZKP that the provider is capable of deriving a public identifier associated with the sender from a secret identifier associated with the sender, the public identifier and the secret identifier including a public key and a private key, respectively, of the sender on the DLN.

In some embodiments, a method includes receiving a request that is configured to trigger a splitting of a combined asset into a first asset and a second asset respectively represented on a distributed ledger-based network (DLN) by a first token commitment and a second token commitment. The method also includes causing, in response to the request and on the DLN, a registration of the first asset and the second asset on the DLN. The registration occurs after verification of a zero-knowledge proof (ZKP), provided by a provider, that the provider has knowledge of an identity of a first asset token of the first asset, an identity of a second asset token of the second asset and/or an identity of a combined asset token of the combined asset. The first token commitment is obtained via an application of a first hashing function on the first asset token. The second token commitment is obtained via an application of a second hashing function on the second asset token. The third token commitment is obtained via an application of a third hashing function on the combined asset token.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:

receiving a request that is configured to cause a transfer of a first asset from a sender to a recipient, the first asset being part of a combined asset that includes the first asset and a second asset;

obtaining, upon receiving the request, a first asset token of the first asset, a combined asset token of the combined asset including a concatenation of the first asset token and a second asset token of the second asset;

generating, on a distributed ledger-based network (DLN), a token commitment representing the first asset and not the second asset via an application of a hashing function on the first asset token of the first asset;

providing, from a provider and to a self-executing code segment on the DLN, a zero-knowledge proof (ZKP)

that the provider has knowledge of an identity of the first asset token of the first asset; and receiving, after verification of the ZKP by the self-executing code segment, a confirmation confirming an addition of the token commitment onto a commitments data structure of the DLN.

2. The method of claim 1, wherein the hashing function is a first hashing function, the first asset token obtained via an application of a second hashing function on an identifying parameter of the first asset.

3. The method of claim 1, wherein the combined asset token of the combined asset consists of the first asset token and the second asset token.

4. The method of claim 1, wherein:

the ZKP includes the ZKP that the provider has knowledge that the combined asset token includes the first asset token and/or the second asset token.

5. The method of claim 1, wherein:

the token commitment is a first token commitment;

a second token commitment represents the combined asset on the DLN; and the first token commitment is added onto the commitments data structure after the self-executing code segment verifies a nullifier is not stored in a nullifier data structure on the DLN prior to the addition of the first token commitment onto the commitments data structure, a presence of the nullifier in the nullifier data structure indicating invalidity of the second token commitment.

6. The method of claim 1, wherein:

the hashing function is a first hashing function;

the token commitment is a first token commitment;

a second token commitment represents the combined asset on the DLN;

the ZKP includes the ZKP that the provider has knowledge of an identity of a nullifier obtained via an application of a second hashing function on a serial number and/or a secret identifier associated with the sender, a presence of the nullifier in a nullifier data structure on the DLN indicating invalidity of the second token commitment.

7. The method of claim 1, wherein the token commitment represents a non- fungible token.

8. The method of claim 1, wherein receiving the confirmation occurs without revealing any identifying information of the first asset, the second asset, the combined asset, and/or the token commitment.

9. The method of claim 1, wherein:

the hashing function is a first hashing function;

the token commitment is a first token commitment; and a second token commitment represents the combined asset on the DLN, the second token commitment obtained via an application of a second hashing function on the combined asset token of the combined asset and/or an identifier associated with the sender.

10. The method of claim 1, wherein the ZKP includes the ZKP that the provider is capable of deriving a public identifier associated with the sender from a secret identifier associated with the sender.

11. A method, comprising:

receiving a request that is configured to trigger a transfer of a first asset from a sender to a recipient, the first asset being part of a combined asset that includes the first asset and a second asset, a token commitment representing the first asset and not a second asset on a distributed ledger-based network (DLN); and causing, in response to the request and on the DLN, a registration of a transfer of the first asset from the sender to the recipient, the registration of the transfer occurring after verification of a zero-knowledge proof (ZKP), provided by a provider, that the provider has knowledge of an identity of an asset token of the first asset, the token commitment obtained via an application of a hashing function on the asset token of the first asset.

12. The method of claim 11, wherein the token commitment represents a non- fungible token.

13. The method of claim 11, wherein:

a combined asset token of the combined asset consists of the first asset token and the second asset token, the ZKP including the ZKP that the provider has knowledge of the combined asset token consisting of the first asset token and the second asset token.

14. The method of claim 11, wherein:

the hashing function is a first hashing function;

the token commitment is a first token commitment;

a second token commitment represents the combined asset on the DLN, the second token commitment obtained via an application of a second hashing function on a combined asset token of the combined asset; and the ZKP includes the ZKP that the provider has knowledge of an identity of:

(a) a first identifier associated with the recipient, the first token commitment obtained via the application of the first hashing function on the first identifier; and/or (b) a second identifier associated with the sender, the second token commitment obtained via the application of the second hashing function on the second identifier.

15. The method of claim 11, wherein:

the hashing function is a first hashing function;

the token commitment is a first token commitment;

a second token commitment represents the combined asset on the DLN;

the ZKP includes the ZKP that the provider has knowledge of an identity of a nullifier obtained via an application of a second hashing function on a serial number and/or a secret identifier associated with the sender, a presence of the nullifier in a nullifier data structure on the DLN indicating invalidity of the second token commitment.

16. The method of claim 11, wherein the registration of the transfer occurs without revealing any identifying information of the sender and/or the recipient, the identifying information of the sender and/or the recipient including a public key of the sender, a private key of the sender, a public key of the recipient and/or a private key of the recipient, on the DLN.

17. A method, comprising:

receiving a request that is configured to cause a splitting of a combined asset into a first asset and a second asset respectively represented on a distributed ledger-based network (DLN) by a first token commitment and a second token commitment;

providing, from a provider and to a self-executing code segment on the DLN, a zero-knowledge proof (ZKP) that the provider has knowledge of an identity of:

(1) a first asset token of the first asset, the first token commitment obtained via an application of a first hashing function on the first asset token;

(2) a second asset token of the second asset, the second token commitment obtained via an application of a second hashing function on the second asset token; and/or (3) a combined asset token of the combined asset, the combined asset token including the first asset token and the second asset token, a third token commitment representing the combined asset on the DLN obtained via an application of a third hashing function on the combined asset token; and receiving, upon verification of the ZKP by the self-executing code segment, a confirmation confirming an addition of the first token commitment and the second token commitment onto a commitments data structure of the DLN.

18. The method of claim 17, wherein the combined asset token consists of the first asset token and the second asset token.

19. The method of claim 17, wherein receiving the confirmation occurs without revealing any identifying information of the first asset, the second asset and/or the combined asset.

20. The method of claim 17, wherein the first token commitment, the second token commitment and/or the third token commitment represent non-fungible tokens.

* * * * *